(12) United States Patent
Chen

(10) Patent No.: US 9,113,455 B2
(45) Date of Patent: Aug. 18, 2015

(54) METHOD AND DEVICE RELATING TO REPLAY TECHNIQUE

(75) Inventor: Peng Chen, Jiangsu (CN)

(73) Assignee: OPTIS CELLULAR TECHNOLOGY, LLC, Plano, TX (US)

( * ) Notice: Subject to any disclaimer, the term of this patent is extended or adjusted under 35 U.S.C. 154(b) by 135 days.

(21) Appl. No.: 14/005,210

(22) PCT Filed: Mar. 14, 2011

(86) PCT No.: PCT/CN2011/000396
§ 371 (c)(1),
(2), (4) Date: Sep. 13, 2013

(87) PCT Pub. No.: WO2012/122670
PCT Pub. Date: Sep. 20, 2012

(65) Prior Publication Data
US 2014/0003329 A1   Jan. 2, 2014

(51) Int. Cl.
*H04B 7/14* (2006.01)
*H04W 72/04* (2009.01)
*H04W 4/00* (2009.01)
*H04W 16/26* (2009.01)
*H04W 12/06* (2009.01)
*H04W 88/04* (2009.01)

(52) U.S. Cl.
CPC .......... *H04W 72/0406* (2013.01); *H04W 4/003* (2013.01); *H04W 16/26* (2013.01); *H04W 12/06* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 2010/0260096 A1* | 10/2010 | Ulupinar et al. | | 370/315 |
| 2010/0309837 A1 | 12/2010 | Yi et al. | | |
| 2010/0322193 A1* | 12/2010 | Hu et al. | | 370/331 |
| 2011/0206094 A1* | 8/2011 | Zhang et al. | | 375/211 |

(Continued)

FOREIGN PATENT DOCUMENTS

| | | |
|---|---|---|
| CN | 1822621 A | 8/2006 |
| CN | 101252527 A | 8/2008 |

(Continued)

OTHER PUBLICATIONS

International Search Report, Application No. PCT/CN2011/000396, Dec. 22, 2011, 2 pages.

(Continued)

*Primary Examiner* — Michael J Moore, Jr.
(74) *Attorney, Agent, or Firm* — Vincent J. Allen; Austin C. Teng; Carstens & Cahoon, LLP

(57) ABSTRACT

A method for mapping each radio bearer over Uu interface to a corresponding radio bearer over Un interface of a relay device in a wireless communication network is provided. The method comprises: creating a first context for a User Equipment (UE) with original IMSI (International Mobile Subscriber Identity) of the UE at the Uu interface of the relay device, creating a second context for the UE with an allocated relay identity at the Un interface of the relay device, wherein the allocated relay identity is allocated based on the original IMSI of the UE, forming a relationship between the first context and the second context based on the relationship between the original IMSI and the allocated relay identity, and mapping the radio bearer over the Uu interface to the radio bearer over the Un interface based on the relationship between the first context and the second context.

20 Claims, 14 Drawing Sheets

(56) References Cited

U.S. PATENT DOCUMENTS

2012/0140666 A1* 6/2012 Takahashi et al. ............ 370/252
2012/0250603 A1* 10/2012 Huang et al. .................. 370/315
2014/0135007 A1* 5/2014 Yu et al. ........................ 455/436

FOREIGN PATENT DOCUMENTS

EP         2244409 A2   10/2010
JP       2010283672 A   12/2010

OTHER PUBLICATIONS

"3rd Generation Partnership Project; Technical Specification Group Radio Access Network; Evolved Universal Terrestrial Radio Access (E-UTRA); Relay architectures for E-UTRA (LTE-Advanced)", 3GPP TR 36.806 V9.0.0, Apr. 21, 2010, 34 pages.

"3rd Generation Partnership Project; Technical Specification Group Core Network and Terminals; General Packet Radio Service (GPRS); GPRS Tunnelling Protocol (GTP) across the Gn and Gp interface", (Release 9), 3GPP TS 29.060 V9.0.0 (Sep. 2009), 150 pages.

"3rd Generation Partnership Project; Technical Specification Group GSM/EDGE Radio Access Network; Packet-switched handover for GERAN A/Gb mode; Stage 2", (Release 9), 3GPP TS 43.129 V9.0.0 (Dec. 2009), 95 pages.

"3rd Generation Partnership Project; Technical Specification Group Radio Access Network; Evolved Universal Terrestrial Radio Access (E-UTRA); Relay architectures for E-UTRA (LTE-Advanced)", (Release 9), 3GPP TR 36.806 V2.0.0 (Feb. 2010), 34 pages.

"3rd Generation Partnership Project; Technical Specification Group Radio Access Network; Evolved Universal Terrestrial Radio Access (E-UTRA); Relay architectures for E-UTRA (LTE-Advanced)", (Release 9), 3GPP TR 36.806 V9.0.0 (Mar. 2010), 34 pages.

"3rd Generation Partnership Project; Technical Specification Group Radio Access Network; Radio Resource Control (RRC); Protocol Specification", (Release 9), 3GPP TS 25.331 V9.0.0 (Sep. 2009), 90 pages.

"3rd Generation Partnership Project; Technical Specification Group Radio Access Network; UTRAN Iu interface Radio Access Network Application Part (RANAP) signalling", (Release 9), 3GPP TS 25.413 V9.0.0 (Sep. 2009), 400 pages.

"3rd Generation Partnership Project; Technical Specification Group Services and System Aspects; General Packet Radio Service (GPRS); Service description; Stage 2", (Release 9), 3GPP TS 23.060 V9.0.0 (Mar. 2009), 275 pages.

* cited by examiner

METHOD AND DEVICE RELATING TO REPLAY TECHNIQUE

CROSS-REFERENCE TO RELATED APPLICATIONS

This application is a National stage of International Application No. PCT/CN2011/000396, filed Mar. 14, 2011, which is hereby incorporated by reference.

TECHNICAL FIELD

The present invention relates to wireless communication technology, more particular to application of relay in the communication network.

BACKGROUND

A communication system is a facility which facilitates communication between two or more entities such as communication devices, network entities and other nodes. A communication system may be provided by one or more interconnect networks and the elements thereof and a plurality of communication devices, for example user devices. One or more gateway nodes may be provided for interconnecting various networks. For example, a gateway node can be provided between an access network and other communication networks. The communication may comprise, for example, communication of data for carrying communications such as voice, electronic mail (email), text message, and multimedia and so on.

A user may communicate via a communication system and access various applications by means of an appropriate communication device. The user communication devices are often referred to as user equipment (UE). An appropriate access system allows the communication device to communicate via the communication system. An access to the communications system may be provided by means of a fixed line or wireless communication interface, or a combination of these. Examples of wireless communication system or network include cellular networks, various wireless local area networks (WLANs), wireless personal area networks (WPANs), and satellite based communication systems and various combinations of these.

In wireless systems a network entity such as a base station provides an access node for communication devices. It is noted that in certain systems, such as the Third Generation (3G) network system like TD-SCDMA (Time Division-Synchronous Code Division Multiple Access), WCDMA (Wideband Code Division Multiple Access) and CDMA (Code Division Multiple Access) 2000, a base station is called 'Node B'. Typically the operation of a base station node and other apparatus of an access system required for the communication are controlled by an appropriate control entity, such as the Radio Network Controller (RNC). The control entity can be interconnected with other control entities of the communication network.

Actually the 3G networks have been widely deployed in almost all major communication system worldwide. The 3G network requires improvement on its coverage since it does not work well in some scenarios, such as cell edge and high speed moving train.

In TD-SCDMA network, Repeater is suggested to improve the coverage. However, it is obvious that Repeater is not better than relay node which is used in LTE-A (Long Term Evolution-Advanced) technologies. The relay node is used between Node B and a destined node, for example a destined user device to improve the coverage of the Node B.

Two architectures which include four alternatives for the relay node, known as architectures A and B, are provided in documents about LTE-A technologies, such as 3GPP TR36.806. However, because of the difference between LTE-A network and 3G networks, the solutions used in LTE-A will result in some disadvantages if they are directly used in 3G networks.

Accordingly, there is a need for a relay technique which can be used well in 3G networks.

SUMMARY OF THE INVENTION

To achieve the foregoing, and in accordance with the purpose of the present invention, a method, a relay device, a relay server and related method which relate to the relay technique are disclosed.

The present invention provides a method for mapping each radio bearer over a Uu interface to a corresponding radio bearer over a Un interface of a relay device in a wireless communication network. The method may include the steps: creating a first context for a User Equipment (UE) with original IMSI (International Mobile Subscriber Identity) of the UE at the Uu interface of the relay device, wherein the first context including information for the radio bearer over the Uu interface; creating a second context for the UE with an allocated relay identity at the Un interface of the relay device, wherein the allocated relay identity having a relationship with the original IMSI, and the second context including information for the radio bearer over the Un interface; forming a relationship between the first context and the second context based on the relationship between the original IMSI and the allocated relay identity; and mapping the radio bearer over the Uu interface to the radio bearer over the Un interface based on the relationship between the first context and the second context.

The method further may include deleting the relationship between the original IMSI and the allocated relay identity in case that a detach procedure, a PDP de-activation procedure, or a handover from the relay device is performed.

According to an aspect of the present invention, a method for data transmission between a first device and a second device through a relay device in a wireless communication system is provided. The method may include receiving data from the first device via a radio bearer over a Uu or Un interface of the relay device; obtaining a radio bearer over the Un interface corresponding to the radio bearer over the Uu interface based on a mapping relationship if the data is received from the Uu interface, or obtaining a radio bearer over the Uu interface corresponding to the radio bearer over the Un interface based on the mapping relationship if the data is received from the Un interface, and transmitting the data to the second device via the obtained radio bearer; in which said mapping relationship is obtained by creating a first context for a User Equipment (UE) with original IMSI (International Mobile Subscriber Identity) of the UE at Uu interface of the relay device, wherein the first context including information for the radio bearer over the Uu interface, creating a second context for the UE with an allocated relay identity at the Un interface of the relay device, wherein the allocated relay identity having a relationship with the original IMSI, and the second context including information for the radio bearer over the Un interface, and forming a relationship between the first context and the second context based on the relationship between the original IMSI and the allocated relay identity, and obtaining the mapping relationship based on the relationship between the first context and the second context.

The first device may be the UE and the second device may be Donor Node B. Or alternatively, the first device may be a Donor Node B and the second device may be the UE.

The method may further include deleting the relationship between the original IMSI and the allocated relay identity in case that a detach procedure, a PDP de-activation procedure, or a handover from the relay device is performed.

According to an aspect of the present invention, a method for serving a relay device in a wireless communication system is provided. The method may include presetting a plurality of relay identities, allocating a relay identity from the plurality of relay identities to a relay device for a User Equipment (UE) based on original IMSI (International Mobile Subscriber Identity) of the UE, and forming a relationship between the original IMSI and the allocated relay identity.

The method may further include deleting the binding relationship between the original IMSI and the allocated relay identity in case that a detach procedure, a PDP de-activation procedure, or a handover from the relay device is performed.

According to an aspect of the present invention, a relay device in a wireless communication system is provided. The system may include a receiver, a transmitter, and a controller, in which the receiver is arranged to receive data via a radio bearer over a Uu interface of the relay device, a transmitter is arranged to transmit data via a corresponding radio bearer over a Un interface of the relay device, based on a mapping relationship between the radio bearer over the Uu interface and the radio bearer over the Un interface, and the controller is arranged to obtain the mapping relationship by: creating a first context for a User Equipment (UE) with original IMSI (International Mobile Subscriber Identity) of the UE at the Uu interface of the relay device, wherein the first context including information for the radio bearer over the Uu interface, creating a second context for the UE with an allocated relay identity at the Un interface of the relay device, wherein the allocated relay identity having a relationship with the original IMSI, and the second context including information for the radio bearer over the Un interface, forming a relationship between the first context and the second context based on the relationship between the original IMSI and the allocated relay identity, and obtaining the mapping relationship based on the relationship between the first context and the second context.

The controller of the relay device may be used to delete the relationship between the original IMSI and the allocated relay identity in case that a detach procedure, a PDP de-activation procedure, or a handover from the relay device is performed.

According to an aspect of the present invention, a relay server which communicates with a relay device is provided. The server may include a memory arranged to store a plurality of preset relay identities, and a controller arranged to allocate relay identity from the plurality of relay identities for a User Equipment (UE) based on the original IMSI (International Mobile Subscriber Identity) of the UE, and forming a relationship between the original IMSI and the allocated relay identity, wherein the allocated relay identity is used by the relay device for creating a second context including information for radio bearers over the Un interface.

The controller of the relay server may further delete the binding relationship between the original IMSI and the allocated relay identity in case that a detach procedure, a PDP de-activation procedure, or a handover from the relay device is performed.

BRIEF DESCRIPTION OF THE DRAWINGS

In the following, the invention will be described in details with reference to an example and the appended drawings, wherein.

DETAILED DESCRIPTION

Figure 1:
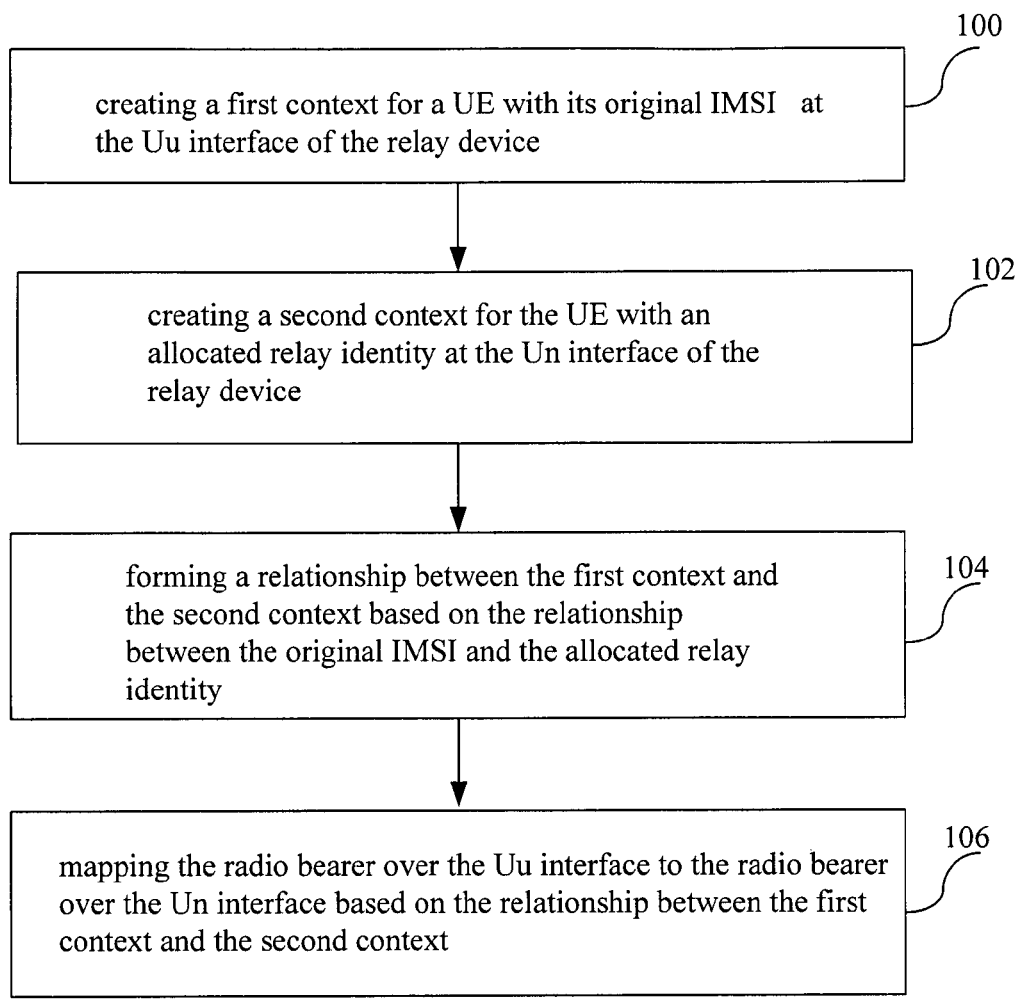
FIG. 1 is a flow chart, showing the method for mapping each radio bearer over Uu interface to a corresponding radio bearer over Un interface of a relay device in a wireless communication network according to an embodiment of the present invention.

In accordance with the architecture A mentioned in the background, the relay node shall set up one GTP tunnel over Un interface for each of a plurality of radio bearers over Uu interface, and further maintain the relationship between the plurality of radio bearers over the Uu interface and the set up GTP tunnel over the Un interface. In this case, all radio bearers over the Uu interface which is of similar QoS requirement are mapped to one radio bearer over the Un interface which conveys multiple GTP tunnels, in which each GTP tunnel corresponds to one radio bearer over the Uu interface. The term "Uu interface" herein refers to the interface via which a relay device (known as relay node in a communication network) communicate with the UE, for example, the Uu interface is the radio interface between UE and relay node, and the term "Un interface" herein refers to the interface via which the relay device communicates with other node in the communication network, for example the interface between the relay Node and the Donor node B.

And thus alternatives of architecture A can only support QoS of relay node bearer granularity. The alternatives in accordance with architecture A introduce extra header overhead in the Un interface. An extra development effort is required with respect to the new header compression mechanism.

In accordance with the architecture B, the relay node shall set up one radio bearer over the Un interface for each of a plurality of radio bearers over the Uu interface, and maintain the mapping relationship between the plurality of radio bearers over the Uu interface and radio bearers over the Un interface.

In order to identify individual UE radio bearer over the Un interface, a UE identifier is added to one of the PDCP (Packet Data Convergence Protocol), RLC (Radio Link Control) or MAC (Media Access Control) protocol layers, and some parts of the legacy MAC/RLC/PDCP protocols have to be modified.

Both architecture A and architecture B introduce some change in Un port, either adding extra GTP/UDP/IP header over PDCP or adding UE identifier in MAC/RLC/PDCP protocol layers, the Radio Access Network (RAN) therefore has to be made adaptive modification, which results in the relay node being not transparent to the RAN.

Furthermore, the relay node according to the architecture requires separate GTP EP to identity each service flow at the Un interface radio bearer, which is not applicable for CS (Circuit Switched) domain in 3G as CS domain do not have GTP tunnel. The relay node in architecture B requires extra UE identifier in MAC/RLC/PDCP layer to identify the UE at Un interface, which is not applicable for CS domain in 3G as the RLC mode for CS call is Transparent Mode and there is no multiplexing of dedicated channels on MAC for CS call's sub-flow, which means there is no MAC/RLC header for CS call's sub-flow. Therefore the relay technique provided by LTE-A can not support the communication in CS domain.

Although the above proposed architectures introduce the relay technique to the communication network, it is not suitable to directly use them in 3G network because the alternatives of the architectures introduce either extra header overhead in Un port, and thus new header compression mechanism is needed or changes in MAC/RLC/PDCP protocol layers have to be done. Further, the two architectures can not be employed in CS domain, which constrains the application of above mentioned alternatives in 3G networks.

Embodiments of this invention provide a relay technique which can be used in 3G networks, and other similar wireless communication networks. It should be noted that it is not intended to limit the present invention to the 3G networks although the following embodiments are described by applying in the 3G networks.

FIG. 1 is a flow chart, showing the method for mapping each radio bearer over Uu interface to a corresponding radio bearer over Un interface of a relay device in a wireless communication network. As shown in FIG. 1, at step 100, a first context for a User Equipment (UE) with original IMSI (International Mobile Subscriber Identity) of the UE is created at Uu interface of the relay device. Then, at step 102, a second context for the UE with an allocated relay identity is created at Un interface of the relay device, in which the allocated relay identity is allocated to the UE based upon the original IMSI of the UE, i.e., the allocated identity and the original IMSI corresponds to each other in a way of one-to-one, and thus a binding relationship is formed between the allocated relay identity and the original IMSI. According to the present invention, the first context is created by the relay device which serves as the access network for the UE, and the second context is created by the relay device which servers as a network access device for a relay UE, in which the relay UE is a shadow UE (i.e., a virtual UE) created by the relay device with the allocated relay identity with respect to the UE. It is understood that one relay UE corresponds to one UE. For clarity, the first context below can be termed the user UE context, and the second context can be termed the relay UE context.

After the first context and the second context are created, a relationship between the first context and the second context are formed based on the one-to-one corresponding relationship of the original IMSI and the allocated relay identity, at step 104. According to the relationship between the first context, including the information for the radio bearer over the Uu interface, and the second context, including the information for the radio bearer over the Un interface, the radio bearer over the Uu interface is mapped (step 106) to the radio bearer over the Un interface, namely, a mapping relationship between the radio bearer over the Uu interface and the radio bearer over the Un interface (one-to-one mapping) is created.

According to the present invention, a plurality of relay identities can be pre-set for example in a device serving the relay device, such as, a relay server. The device allocates a relay identity which is not associated with any other UE for example when receiving a request for the relay identity. The allocated identity to the UE is based on the UE's original IMSI, thereby the binding relationship exists between the allocated identity and the UE's original IMSI.

The first context, also called as user UE context, is created for the UE by the relay device at the Uu interface, through which the relay device communicates with the UE, with the original IMSI. The second context, also called as relay UE context, is also created for the UE by the relay device at the Un interface with the allocated relay identity, where the relay device can communicate with other node in the communication network, such as Donor Node B, via the Un interface.

For each UE, the user UE context comprises the information for the radio bearers which are established over the Uu interface for various services flow of the UE, and the relay UE context comprises the information for the radio bearers which are established over the Un interface. The information comprised by the user UE Context includes the radio bearer Id and the radio bearer mapping information for each radio bearer in the context, where the radio bearer refers to the radio bearer over the Uu interface. The information included by the relay UE Context includes the radio bearer Id and the radio bear mapping information for each radio bearer in the context, where the radio bearer refers to the radio bearer over the Un interface. The radio bearer Id and radio bearer mapping information in user UE Context are set by the relay device according to the relay device's configuration and the radio bearer's QoS characteristic; while the radio bearer Id and radio bearer mapping information in the relay UE Context are set by the relating controller, such as the RNC, according to its configuration and the radio bearer's QoS characteristic. The binding relationship between the radio bear Id of each of the radio bearers in user UE Context and the radio bearer Id of each of the radio bearers in Relay UE Context is explicitly signaled over network to the relay device.

Optionally, a mapping table, showing the relationship of the radio bearer over the Uu interface and the radio bearer over the Un interface, can be created and maintained by the relay device.

According to the present invention, the relationship between the original IMSI and the allocated relay identity for any UE, in case that a detach procedure, a PDP de-activation procedure, or a handover from the relay device such as to UTRAN (UMTS Terrestrial Radio Access Network) is performed, can be deleted. And thus, the mapping relationship of the radio bearers over the Uu interface and the radio bearers over the Un interface which relate to said original IMSI and said original allocated relay identity, respectively, can be deleted from the mapping table. Then the allocated relay identity is released and returned to a relay identities pool, if any, to be re-used. As an example, the identities pool can be a memory provided with a server serving the relay device, or can be a memory in the relay device.

Figure 2:
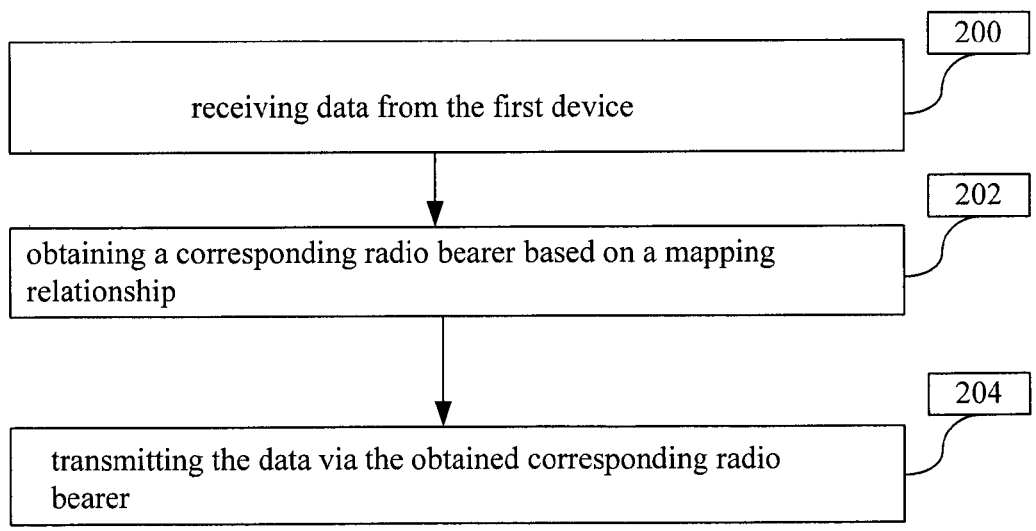
FIG. 2 is a flow chart, illustrating the method for data transmission between a first device and a second device through a relay device in a wireless communication system, according to one embodiment of the present invention.

FIG. 2 is a flow chart, illustrating the method for data transmission between a first device and a second device through a relay device in a wireless communication system, according to one embodiment of the present invention. As shown, the relay device receives (step 200) data from the first device via a radio bearer over the Uu interface or Un interface of the relay device. The first device, according to the invention, can be a UE, or can be another device in the communication system, such as Donor Node B. If the first device is UE, then the relay device receives the data through the radio bearer over the Uu interface; while if the first device is another device in the communication system, the relay device receives the data through the radio bearer over the Un interface.

After receiving the data from the first device, the relay device obtains (step 202) a radio bearer which corresponds to the radio bearer over the interface receiving the data, i.e., the Uu interface or the Un interface, based on the mapping relationship as above discussed with reference to FIG. 1. In case of the first device being UE, the relay device obtains the radio bearer over the Un interface corresponding to the radio bearer over the Uu interface from the mapping relationship. In case of the first device being another device in the communication network, such as Donor Node B, the relay device obtains the radio bearer over the Uu interface corresponding to the radio bearer over the Un interface.

Once the corresponding radio bearer is obtained, the relay device transmits (step 204) the received data to the second device via the obtained radio bearer. As the relationship between the radio bearer over the Uu interface and the radio bearer over the Un radio interface are formed based on the user UE context and the relay UE context, there is no requirement to unpack the data packet and then pack the data again which are performed according to some alternative of LTE-A. Therefore the time of transmission is reduced.

As above discussed, the relationship between the original IMSI and the allocated identity, in case that a detach procedure, a PDP de-activation procedure, or a handover from the relay device such as to UTRAN is performed, can be deleted. And thus, the mapping relationship of the radio bearer over the Uu interface and the radio bearer over the Un interface, which relate to the original IMSI and the allocated identity, respectively, can be deleted from the mapping table. Then the allocated identity is released and returned to the server, if any, to be re-used.

Figure 3:
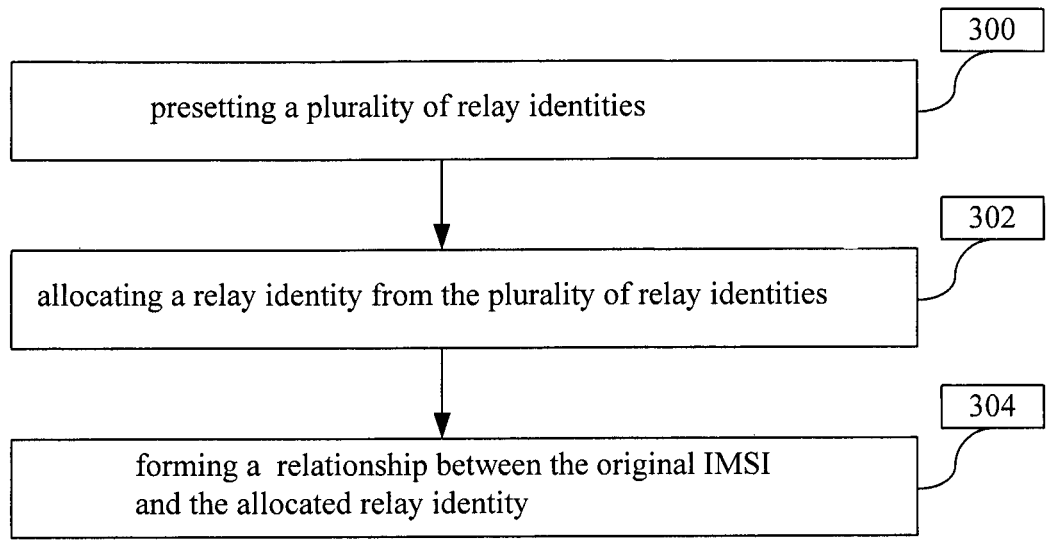
FIG. 3 is a flow chart, illustrating the method for severing the relay device in the wireless communication network.

FIG. 3 is a flow chart, illustrating the method for severing the relay device in the wireless communication network. As shown, a plurality of relay identities can be pre-set at step 300. Then a relay identity is taken from the plurality of identities so as to allocate it to a UE, at step 302. The allocated relay identity is sent to the relay device, where a second context, namely, the relay UE context is created for the UE with the allocated relay identity in the relay device. At step 304, a binding relationship between the original IMSI and the allocated relay identity is created and maintained. Optionally, a server table can be used to store the binding relationship. When a detach procedure, a PDP de-activation procedure, or a handover from the relay device such as to UTRAN is performed, the binding relationship between the allocated relay identity and the original IMSI is deleted. Therefore the allocated relay identity is returned to be one identity of said plurality of identities.

Figure 4:
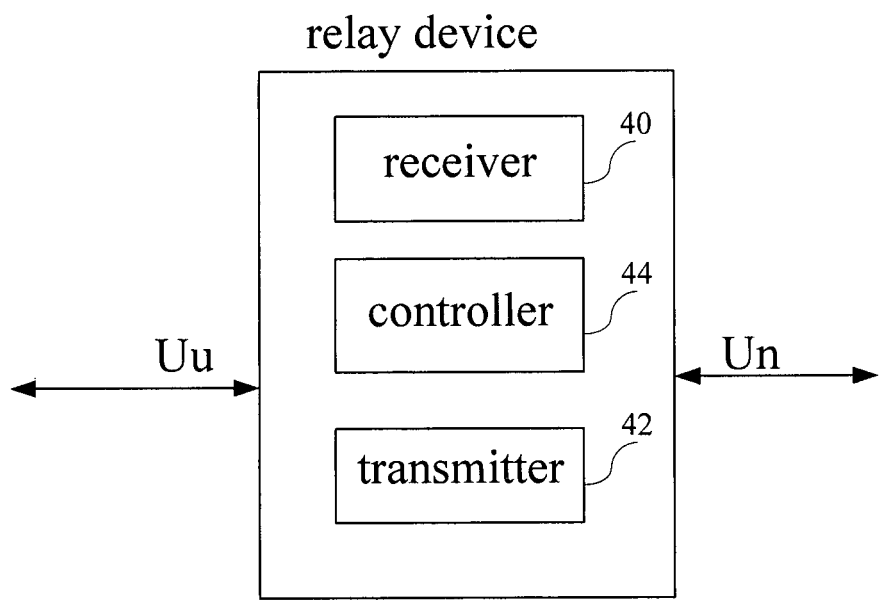
FIG. 4 illustrates the block diagram of the relay device according to one embodiment of the invention.

FIG. 4 illustrates the block diagram of the relay device according to one embodiment of the invention. It is understood that a relay device can be termed a relay node in the communication network. The relay device includes a receiver 40, a transmitter 42, and a controller 44.

The controller 44 creates a first context for a User Equipment (UE) with original IMSI of the UE over Uu interface of the relay device. The controller 44 further creates a second context for the UE with the allocated relay identity for the UE. The allocated relay identity is allocated based on the original IMSI, and therefore a binding relationship, for example one-to-one relationship is formed between the original IMSI and the allocated relay identity. The controller 44 then forms a relationship between the first context and the second context based on the binding relationship, thereby to obtain the mapping relationship between the radio bearer over the Uu interface and the radio bearer over the Un interface. A mapping table showing the mapping relationship can be created and maintained by the relay device. The mapping table can be saved for example in a memory (not shown) of the relay device or can be saved in an exterior memory connected to the relay device.

The receiver 40 receives data from a first device via a radio bearer over Uu interface or Un interface of the relay device. The first device, according to the invention, can be a UE, or can be another device in the communication system, such as Donor Node B. If the first device is UE, then the relay device receives the data through the radio bearer over the Uu interface; and if the first device is another device in the communication system, the relay device receives the data through the radio bearer over the Un interface.

Assuming that the first device is the UE, after receiving the data from the UE, the relay device obtains the radio bearer over the Un interface corresponding to the radio bearer over the Uu interface based on the mapping relationship as above discussed. And then the transmitter 42 transmits the received data to the second device via the obtained radio bearer. For example, it transmits the received data via the radio bearer over the Un interface of the relay device to the Donor Node B.

In case of the first device being another device in the communication network, such as Donor Node B, the relay device obtains the radio bearer over the Uu interface corresponding to the radio bearer over the Un interface from the mapping relationship. The transmitter then transmits the received data to the second device via the obtained radio bearer. For instance, the transmitter 42 transmits the received data via the radio bearer over the Uu interface of the relay device to the UE.

The relay device creates the relay UE context based on the allocated relay identity and creates the user UE context based on the original IMSI. With the allocated relay identity being allocated on the basis of the original IMSI, namely, the allocated relay identity and the original IMSI has a binding relationship, the user UE context created with the original IMSI and the relay UE context created with the allocated relay identity thus have a one-to-one relationship. Further, the user UE context includes the information for the radio bearer over the Uu interface and the relay UE context includes the information for the radio bearer over the Un interface, the radio bearer over Uu interface and the radio bearer over Un interface can thus being mapped each other. The information comprised by the user UE Context includes the radio bearer Id and the radio bearer mapping information for each radio bearer in the context, where the radio bearer refers to the radio bearer over the Uu interface. The information comprised by the relay UE Context includes the radio bearer Id and the radio bear mapping information for each radio bearer in the context, where the radio bearer refers to the radio bearer over the Un interface. The radio bearer Id and radio bearer mapping information in user UE Context are set by the relay device according to the relay device's configuration and the radio bearer's QoS characteristic; while the radio bearer Id and radio bearer mapping information in the relay UE Context are set by the relating controller, such as the RNC, according to its configuration and the radio bearer's QoS characteristic. The binding relationship between the radio bear Id of each of the radio bearers in user UE Context and the radio bearer Id of each of the radio bearers in Relay UE Context is explicitly signaled over network to the relay device.

Compared to the architectures provided by LTE-A, mapping the radio bearer over the Uu interface to that over the Un interface based upon the contexts enable each radio bearer over Uu interface can be corresponded to respective radio bearer over Un interface, that is, the radio bearer over the Uu interface is mapped to that over the Un interface by means of one-to-one. Therefore, each radio bearer over Uu interface, according to the present invention, have its required QoS level, rather than all radio bearer over Uu interface have the same QoS level in accordance with some architecture provided by LTE-A.

Furthermore, the relay device according to the present invention does not introduce any change on layers, such as MAC, RLC, or PDCP layer. Thus in comparison with the architecture provided by LTE-A, the relay technique disclosed herein is transparent to the RAN. And extra header compression are not required at Un interface of the relay device since the Un interface does not need to identify the service flow of each UE over the radio bearer over the Un interface by using GTP-U point.

Again, compared to the some alternatives provided by LTE-A, better precision of the QoS can be provided due to the UE bearer granularity according to the present application.

As the relay techniques disclosed herein are not related GTP tunnel and so on, it can be used only in the PS domain but the CS domain.

Figure 5:
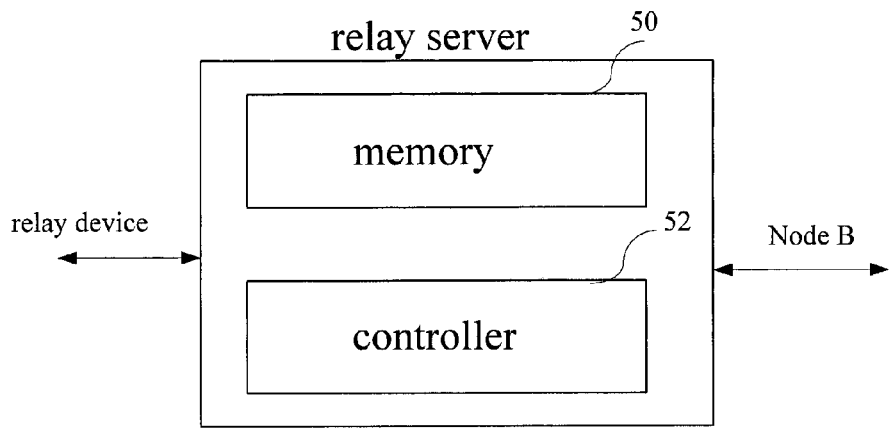
FIG. 5 illustrates the block diagram of a relay server according to one embodiment of the invention.

FIG. 5 illustrates the block diagram of a relay server according to one embodiment of the invention. The relay server includes a memory 50 and a controller 52. It would be apparent to those skilled in the art that the relay server also can include a receiving module and transmitting module although they are not shown in FIG. 5. The memory 50 stores a plurality of pre-set relay identities. The controller 52 takes a relay identity from the plurality of pre-set identities and allocates it to a UE for example when the relay server receives a request from the UE or a relay device. The allocated relay identity is sent to the relay device to create a relay UE context for the UE with the allocated relay identity. The controller 52 allocates the relay identity based on the original IMSI of the UE, namely, one relay identity is allocated corresponding to one original IMSI.

Figure 6A:
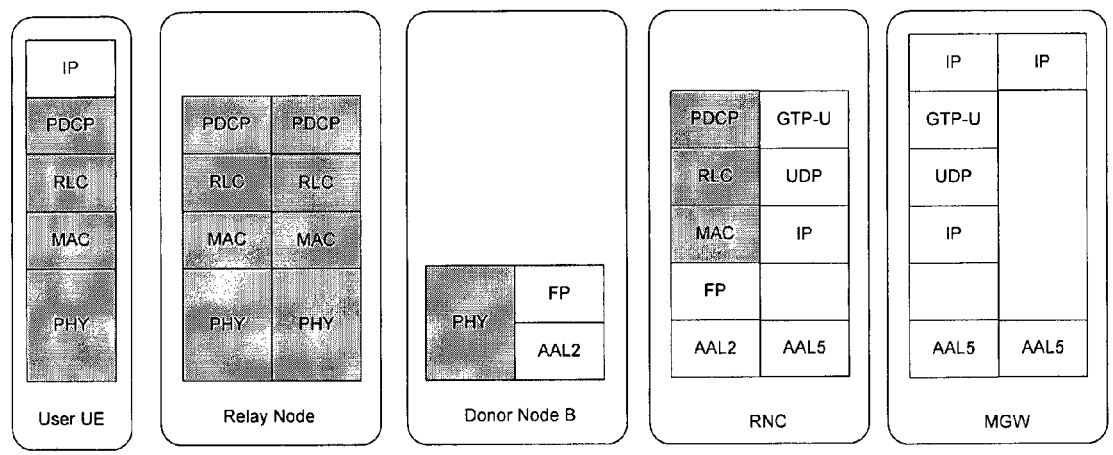
FIG. 6A-6C illustrates the protocol stacks for the User Plane of UE, the Control Plane of UE, and Control Plane of relay UE, respectively.
Figure 6B:
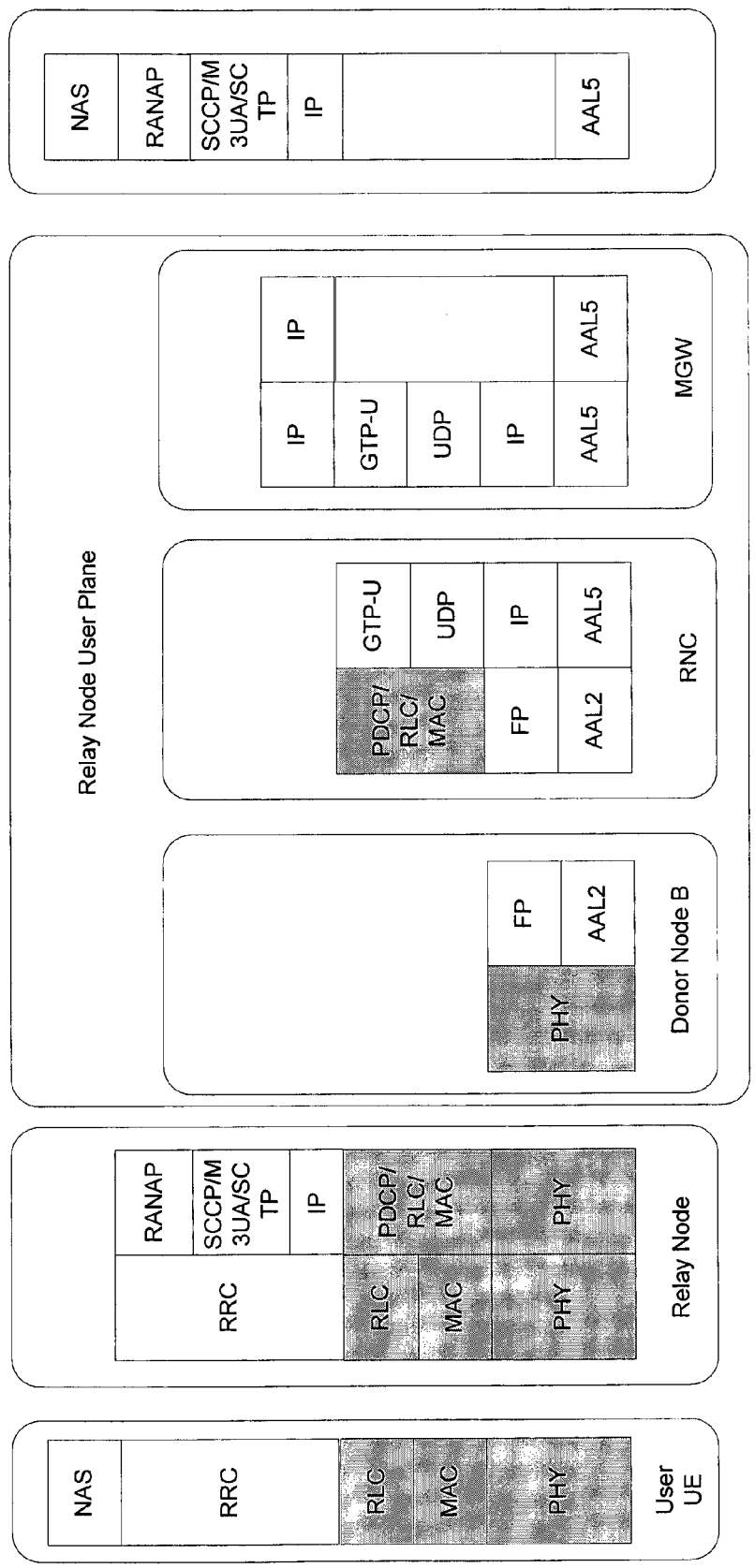
Figure 6C:
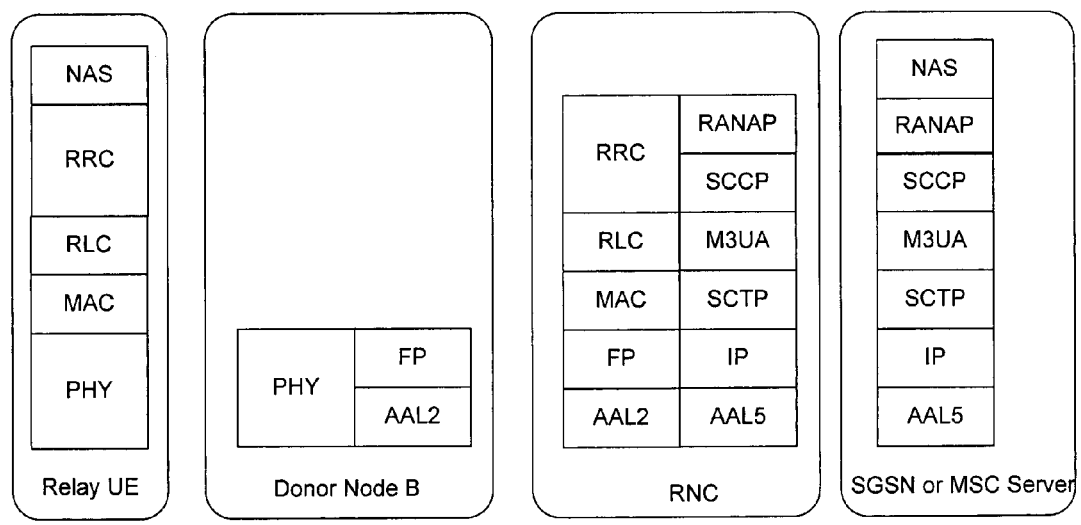

FIG. 6A illustrates the protocol stacks for the User Plane of UE, FIG. 6B illustrates the protocol stacks for the Control Plane of UE, and FIG. 6C illustrates the protocol stacks for Control Plane of relay UE. A relay device, also known as relay node, has two radio interfaces, the Uu interface (communicate with the UE) and the Un interface (communicate with the Donor Node B). For User Plane of UE, the relay node terminates PHY/MAC/RLC/PDCP in both the Uu interface and the Un interface, and relay data transmission upon PDCP. For Control Plane of UE, there is an IP connection between the relay node and relay server. The relay node terminates RRC at Uu interface, and conveys the NAS message over a RANAP signaling bearer through the IP connection. There is signaling connection between the relay node and the SGSN server for each created relay UE and the relay node itself.

Hereinafter we would describe particular procedures in a communication network including the relay device and relay server described above. However, it is not intended to limit that the relay device and relay server have to be used in the manner of combination. As one skilled in the art can conceive, the relay device and the relay server according to the invention can be separately used in the communication network.

It should be noted that in the following procedures, the relay device will be termed relay node as one element of the communication network.

Figure 7:
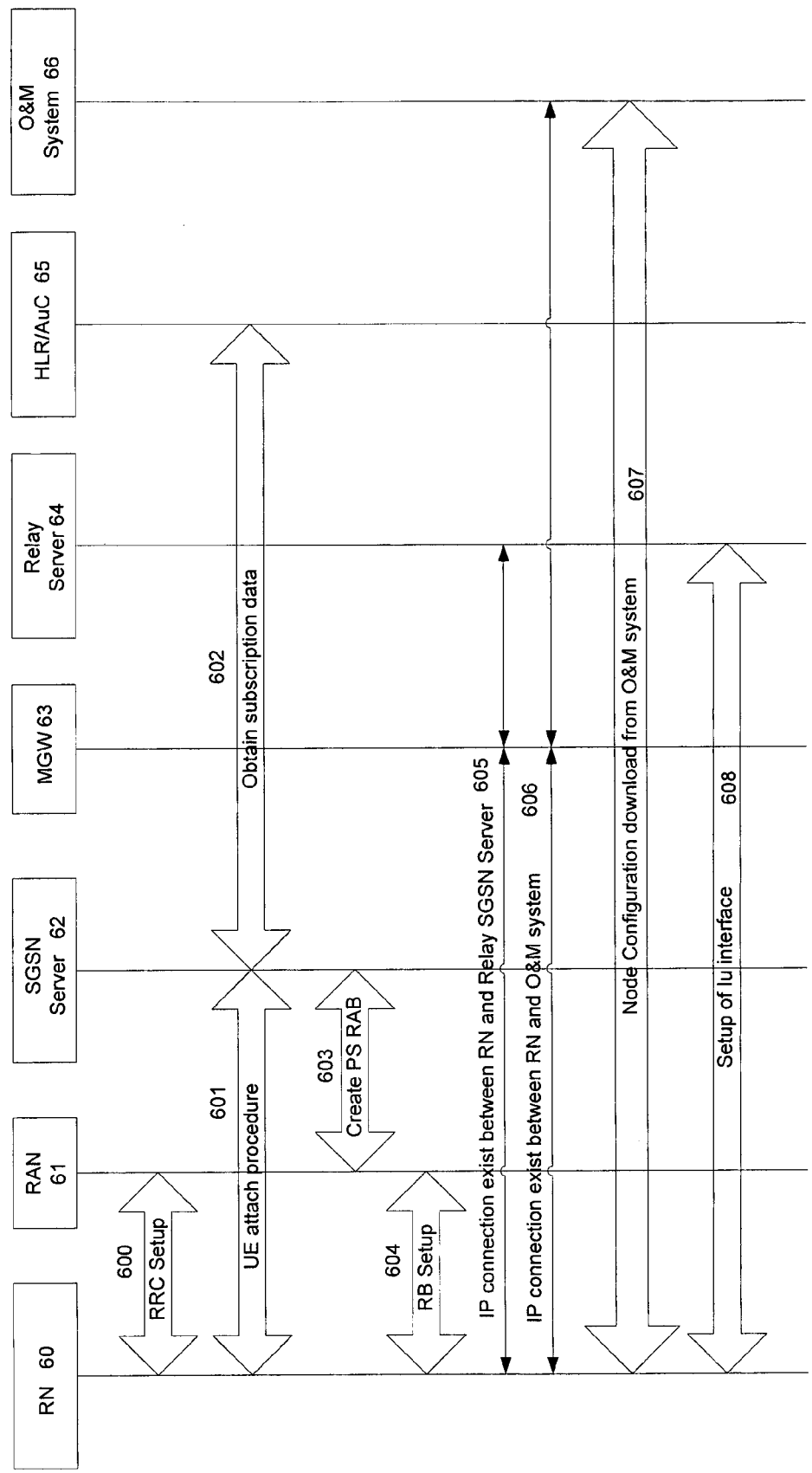

FIG. 7 shows the procedure of starting up the relay node (RN). The starting up procedure for the relay node mainly includes two stages. In the first stage, the relay node attaches to the network via the legacy UE attach procedure and sets up a RAB (Radio Access Bearer) so as to establish the IP connection. In the second stage, after the IP connection being established, the O&M system authenticates the relay node and downloads configuration data to the RN. The RN establishes the necessary Iu interface with relay SGSN server, and then the RN goes into normal operation.

In the procedure shown in FIG. 7, the network elements or nodes involved includes the RN 60, RAN (Radio Access Network) 61, SGSN (Serving GPRS Support Nodes) server 62, MGW (Media GateWay) 63, relay server 64, HLR (Home Location Register)/AuC 65, and O&M system 66. The elements or nodes shown in FIG. 7 exception of the relay node 60 and the relay server 64 are the conventional elements or nodes according to the 3G network, with only the SGSN sever having a little change in signaling process which will be described in more detail hereinafter. Furthermore, the HLR/AuC 65 represents according to the embodiments, the Authentication Controlling function is integrated into the HLR. However, in practice, the Authentication Controlling function can be set in other node or in a separate node.

With reference to FIG. 7, after RRC (Radio Resource Controller) connection is set up (step 600) between the RN 60 and the RAN 61, the relay node 60 initiates (step 601) UE attach procedure to the SGSN server 62. Then the SGSN server 62 obtains the subscription data for the UE from the HLR/AuC 65. After obtained the subscription data, the SGSN server 62 can create (step 603) RAB for RAN. The RB for relay node 60 is thus created (step 604). Therefore, the IP connection between the RN 60 and the relay server 64 exists as shown in step 605, and the IP connection between the RN 60 and the O&M system 66 exists as shown in step 606. In case that the IP connection between the RN 60 and the O&M system 66 is established, the configuration for the relay node 60 can be download from the O&M system 66 as shown at step 607. The Iu interface of the relay node 60 for the relay server 64 is set up (step 608).

Figure 8:
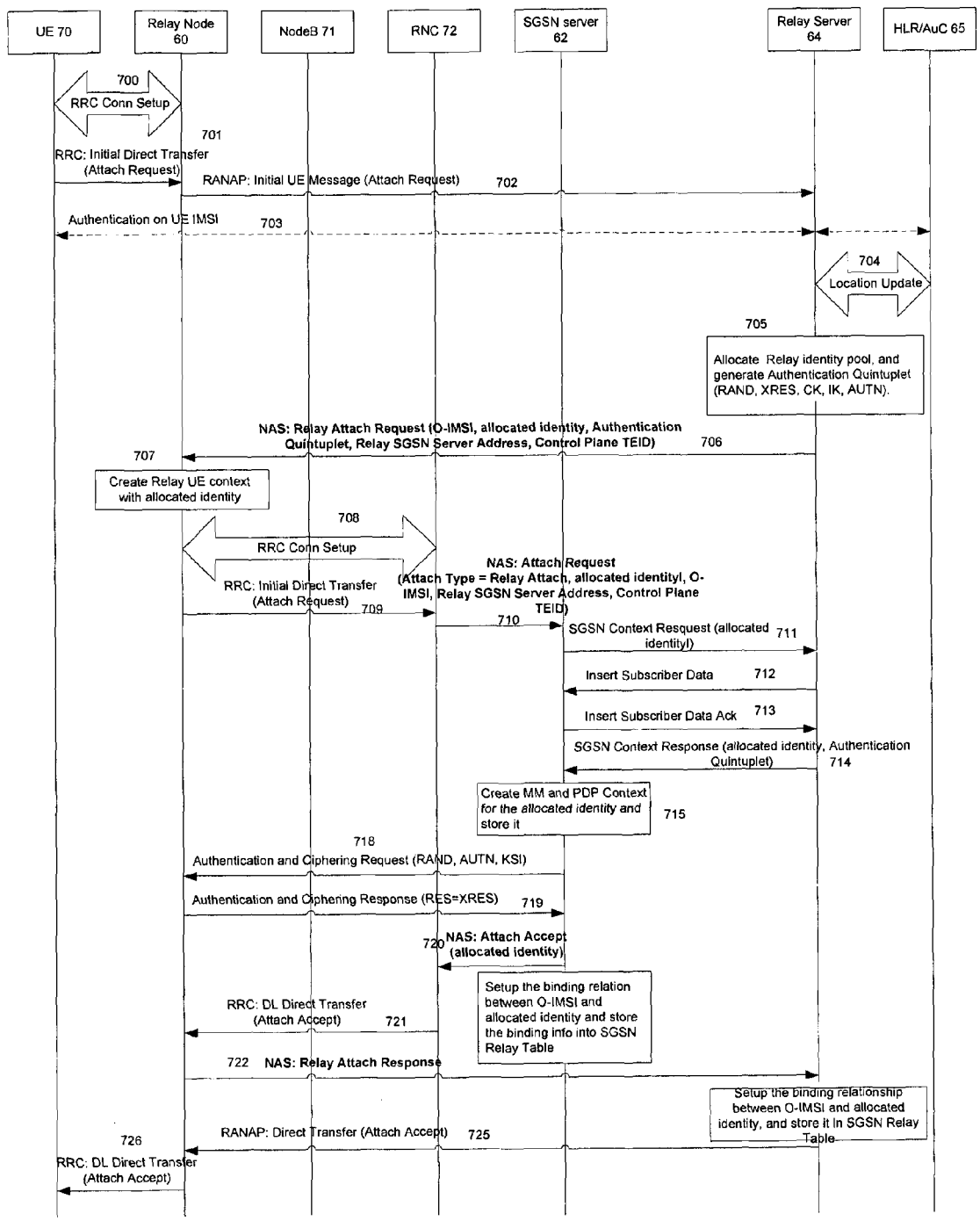

FIG. 8 shows the attach procedure of a UE connecting to the network via the relay device according to the present invention. The network elements or nodes involved in this procedure can include RN 60, Node B 71, RNC (Radio Network Controller) 72, SGSN server 62, relay server 64, and HLR/AuC 65. A RRC connection is set up (step 700) between the UE 70 and the relay node 60. The UE 70 can send (step 701) an Initial Direct Transfer Message including the information for UE service request to the relay node 60. The relay node 60 further sends (step 702) an Initial UE message to the relay server 64, in order to inform of the relay server 64 the contents of the service request. After the authentication to the original IMSI of UE 70 is passed (step 703), the HLR/AuC 65 updates the location of the UE 70 (step 704). The relay server 64 then allocates a relay identity to the UE based on the original IMSI of the UE and generates an Authentication Quintuplet (RAND, XRES, CK, IK, AUTN) (step 705). As an example, a pre-set multiply identities are stored in a memory of the relay server, the relay server takes an identity from the memory and allocates it to the UE.

Then, a Non-access (NAS) signaling connection between the relay node 60 and the relay server 64 is set up. A relay attach NAS procedure is thus initiated. The relay server 64 sends (step 706) a NAS Relay Attach Request message, which includes the original IMSI, the allocated relay identity, the generated Authentication Quintuplet, the relay server Address and the control plane TEID (Tunnel End point ID), to the relay node 60. It is understood that the NAS message should be ciphered to prevent the Authentication Quintuplet at Un interface of the relay node 60 from being leaked. The relay node 60 creates (step 707) the relay UE context with the allocated identity for the UE.

Then a procedure of attaching the relay UE corresponding to the UE 70 to the SGSN server is initiated by the relay UE created in the relay node 60. A RRC connection is set up (step 708) between the relay node 60 and the RNC 72. As above mentioned, the relay UE is a shadow device created by the relay node for the UE.

For procedures where the relay UE created by the relay node corresponding to the UE 70 logically performs the procedures, it shall be noted that the relay node is the physical entity performing said attach procedures herein according to the present invention.

After the RRC connection setup, the relay node 60 sends (step 709) an Initial Direct Transfer message to the RNC 72 in order to request for attaching to the network. The RNC 72 sends (step 710) the NAS Attach Request message to the SGSN server 62, wherein the Attach Request message includes the allocated relay identity, the original IMSI, address of the relay server 64, and the Control Plane TEID. Then the SGSN server 62 sends (step 711) SGSN Context Request with the allocated relay identity to the relay server 64. After the Insert Subscriber Data request from the relay server 64 to the SGSN server 62 (step 712) and the Insert Subscriber Data Ack message from the SGSN server 62 to the relay server 64 (step 713), the relay server 64 sends (step 714) a SGSN Context Response message including the allocated relay identity and the Authentication Quintuplet to the SGSN server 62. The SGSN Server 62 thus obtains the Authentication Quintuplet, which is generated for the Relay UE, from the relay server 64, and authenticates the relay UE with the Authentication Quintuplet. The subscriber data for the UE is also got from the relay server 64. Then the SGSN server 62 creates MM and PDP context for the allocated relay identity and stores them (step 715).

After the Authentication and Ciphering Request from the SGSN server to the relay node and the Authentication and Ciphering response from the relay node to the SGSN server (steps 718 and 719), the SGSN server 62 sends (step 720) a NAS Attach Accept message with the allocated relay identity to the RNC 72. The RNC 72 then forwards (step 721) the DL Direct Transfer message to the relay node 60. After the NAS Relay Attach Response Message is sent (step 722) to the relay server 64 from the relay node 60, the relay node 60 can thus attach to the network. According to the present invention, a binding relationship between the allocated identity and the original IMSI is set up in the relay node 60 and also in the SGSN server 62. As an example, a server relay table indicating the binding relationship between the relay UE identified by the allocated relay identity and the UE identified by the original IMSI can be created in the SGSN server and stored in the memory of the SGSN server. Also, another server relay table showing the binding relationship between the relay UE identified by the allocated relay identity and the UE identified by the original IMSI can be created in the relay server and stored in the memory which is shown in the FIG. 5.

The relay server 64 sends (step 725) a Direct Transfer message to the relay node 60, and the relay node further forwards (step 726) a DL Direct Transfer message to the UE 70. The request of attaching the UE 70 to the network is thus achieved.

According to the present invention, the legacy attach mechanism for the UE attach procedure is employed with only new signaling relating to the relay node and the relay server which are introduced to the 3G network.

Figure 9:
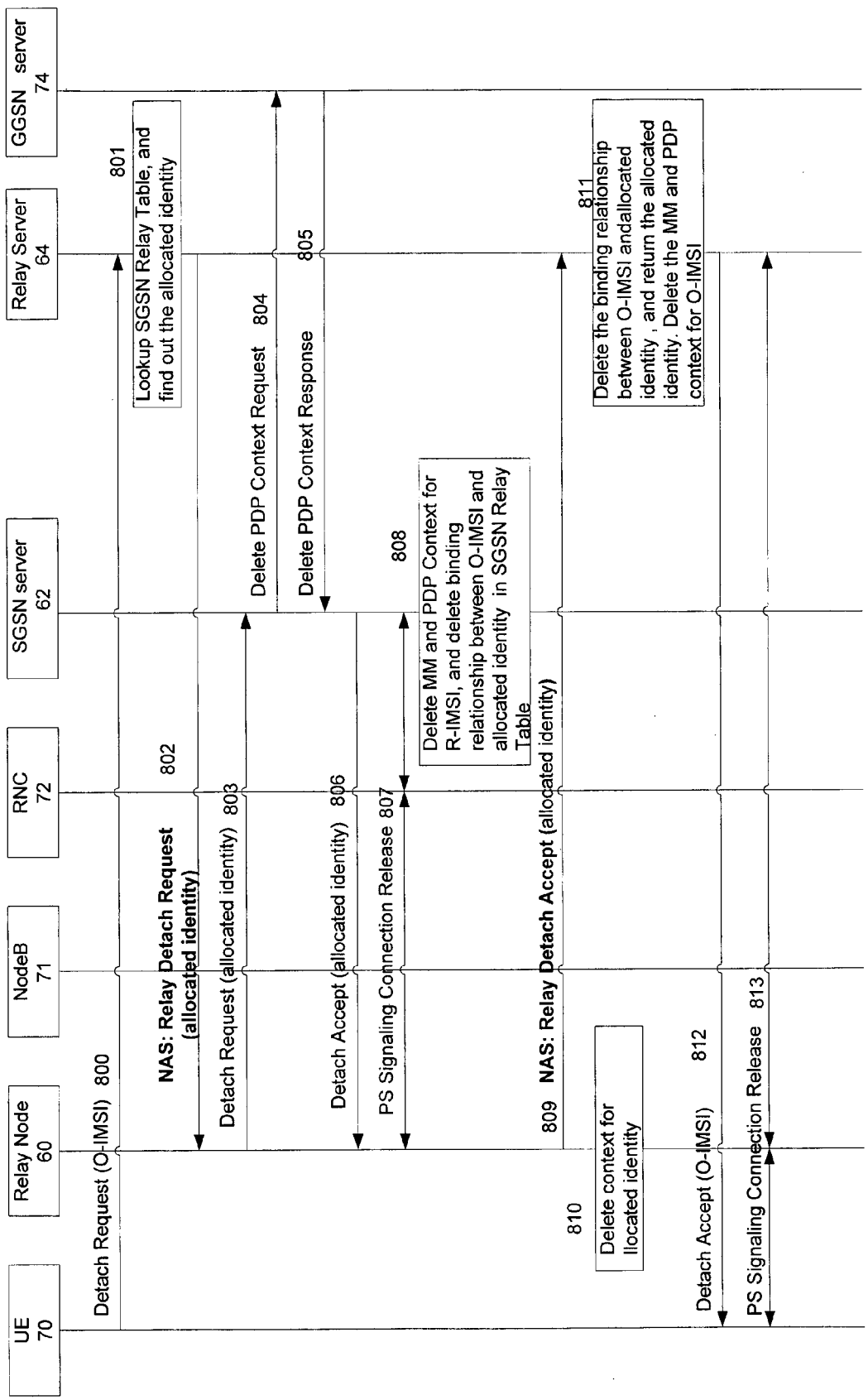

FIG. 9 shows the detach procedure of a UE connection via a relay node. The network elements or nodes involved in this procedure includes RN 60, Node B 71, RNC 72, SGSN server 62, relay server 64, and GGSN (GPRS Gateway Support Nodes) server 74. The UE 70 initiates a legacy detach procedure with original IMSI by sending a Detach Request to the relay server 64 (step 800). The relay server 64 looks up the server relay table to find out the allocated relay identity which corresponds to the original IMSI (step 801). Then, the relay server 64 sends a NAS Relay Detach Request message with the allocated relay identity which has been found to the relay node 60 (step 802) to command the relay UE in the relay node 60 to initiate the detach of the relay UE with the allocated identity to the SGSN server 62. The relay node 60 thus initiates the relay UE detach procedure by sending (step 803) a Detach Request message with the allocated relay identity to the SGSN server 62. Accordingly, the SGSN server 62 sends (step 806) a Detach Accept message to the relay node 60 after it sends (step 804) a Delete PDP Context Request message to the GGSN server 74 and obtains (step 805) the Delete PDP Context Response from the GGSN server 74. Then PS signaling connections between the relay UE in the node 60 and the SGSN server 62, the RRC between the relay UE and the RNC 72 are released (step 807). The SGSN server 62 then deletes the MM and PDP Context which is created with the allocated relay identity by the SGSN server, and further deletes the binding relationship between the original IMSI and the allocated relay identity in the server relay table (step 808).

The relay node 60 sends (step 809) a NAS Relay Detach Accept message with the allocated identity which is found at step 801 by SGSN server 62 to the relay server 64. And the relay node 60 deletes (step 810) the relay UE context corresponding to the UE which requests the detaching. And the SGSN server 62 deletes the binding relationship between the original IMSI and the allocated relay identity (step 811). Optionally, the relay server 64 returns the identity which is deleted from the binding relationship of the server table to the memory of the relay server to enable it can be re-used. Then the relay server 64 sends (step 812) a Detach Accept message to the UE 70. The PS signaling connection between the UE and the relay server 64 is released (step 813).

Figure 10:
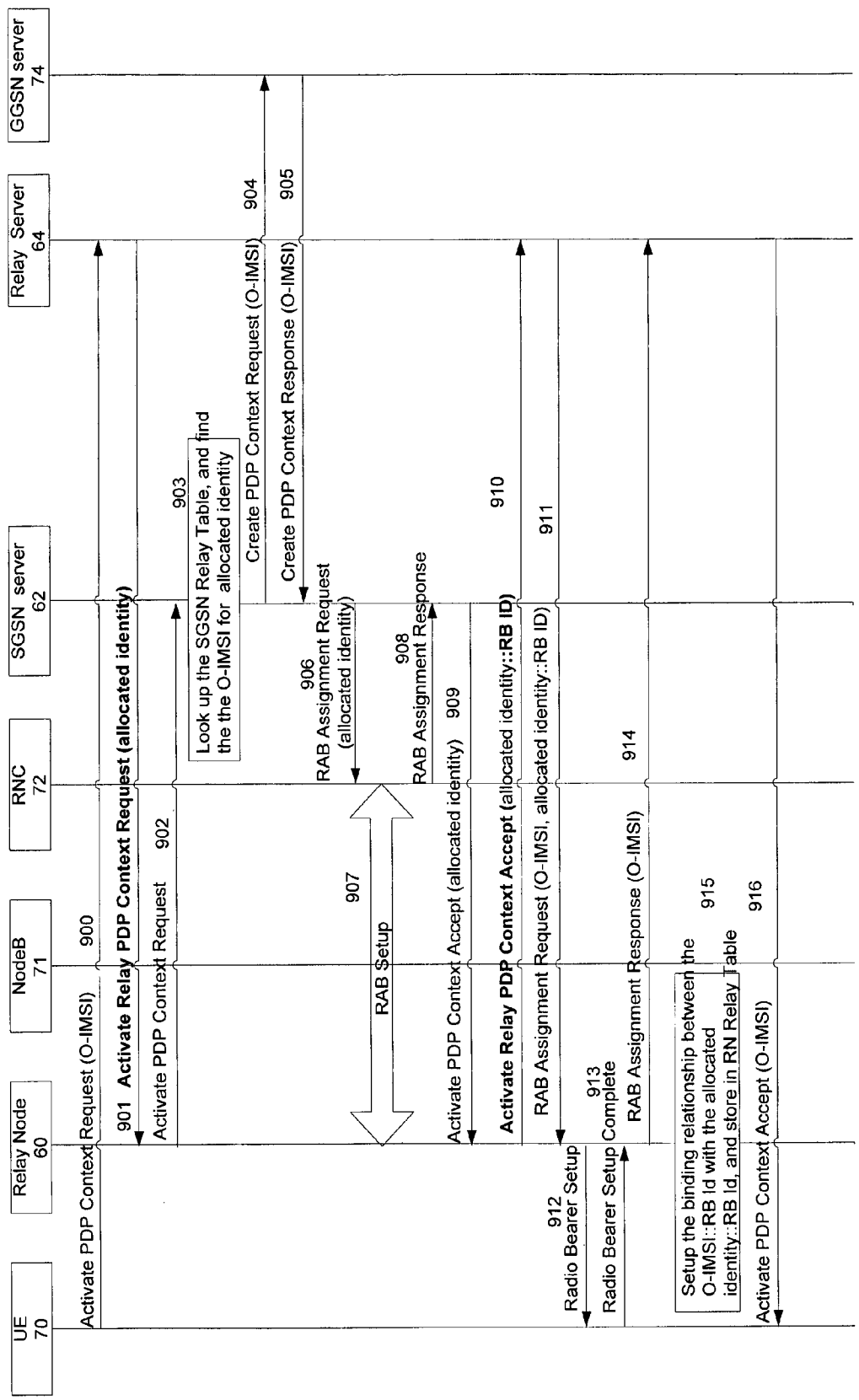

FIG. 10 shows the PDP activation procedure. The network elements or nodes involved in this procedure includes RN 60, Node B 71, RNC 72, SGSN server 62, relay server 64, and GGSN server 74. The UE 70 initiates the PDP Activation procedure by sending (step 900) an Activate PDP Context Request message with original IMSI to the relay server 64. The relay server 64 sends (step 901) an NAS Activate PDP Context Request message with the allocated relay identity for the UE 70 to the relay node 60, to command the relay UE corresponding to the UE 70 in the relay node 60 initiating (step 902) the PDP Activation procedure to the SGSN server 62. The SGSN server 62 looks up the server relay table and finds out the original IMSI corresponding to the allocated relay identity (step 903). Then, After the SGSN server 62 sends (step 904) a Create PDP Context Request message with Original IMSI and receives (step 905) the Create PDP Context Response with original IMSI to and from the GGSN server 74, the SGSN server 62 sends (step 906) RAB Assignment Request message with the allocated relay identity to the RNC 72, to command the relay node 60 to set up one RAB which corresponds Radio Bearer over Un interface. Thus a RAB with required QoS can be set up (step 907). Then the RNC 72 sends (step 908) a RAB Assignment Response to the SGSN server 62. The SGSN server 62 sends (step 909) Activate PDP Context Accept message to the relay node 60. The relay node 60 then can send (step 910) the identity of the radio bearer setup for the RAB to the relay server 64 via the Activate Relay PDP Context Accept message, where the message contains the radio bearer ID which is set up over the Uu interface for the set up RAB. The relay server 64 then asks the relay node 60 to set up one RAB over Uu port by sending (step 911)

a RAB assignment Request message, where the message includes the information which radio bearer over Un interface the radio bearer over Uu interface should be mapped to. Then the relay node 60 sends (step 912) a Radio Bearer Setup message to the UE 70 to command the UE establish the radio bearer over the Uu interface. After the relay node 60 receives (step 913) the Radio Bearer Setup Complete message from the UE 70, it sends (step 914) a RAB Assignment Response message with original IMSI to the relay server 64. Based on the RAB Assignment Request message, the relay node 60 can set up (step 915) the mapping relationship between the radio bearer over the Uu interface and the radio bearer over the Un interface after the radio bearer is set up over the Uu interface. Optionally, a mapping table can be used to save the set up mapping relationship. Then the relay server 64 sends (step 916) an Activate PDP Context Accept message with original message to the UE 70. As above described, the relay server 64 initiates the PDP Activation procedure and sets up a radio bearer over the Un interface for the relay UE which corresponds to the UE 70. After the PDD activate is achieved, the relay UE sends the radio bearer ID of the set up radio bearer to the relay server 64. Then the relay server 64 initiates the RAB setup procedure, the relay server 64, as shown at step 911, sends the RAM Assignment Request with the radio bearer ID of the set up radio bearer over the Un interface, so as to make the relay node 60 map the radio bearer which is created for the UE 70 over the Uu interface to the radio bearer earlier set up over the Un interface.

After the attach procedure, the UE is connected to the network via the relay node, while the radio bearer over the Uu interface is mapped to the radio bearer over the Un interface.

Figure 11:
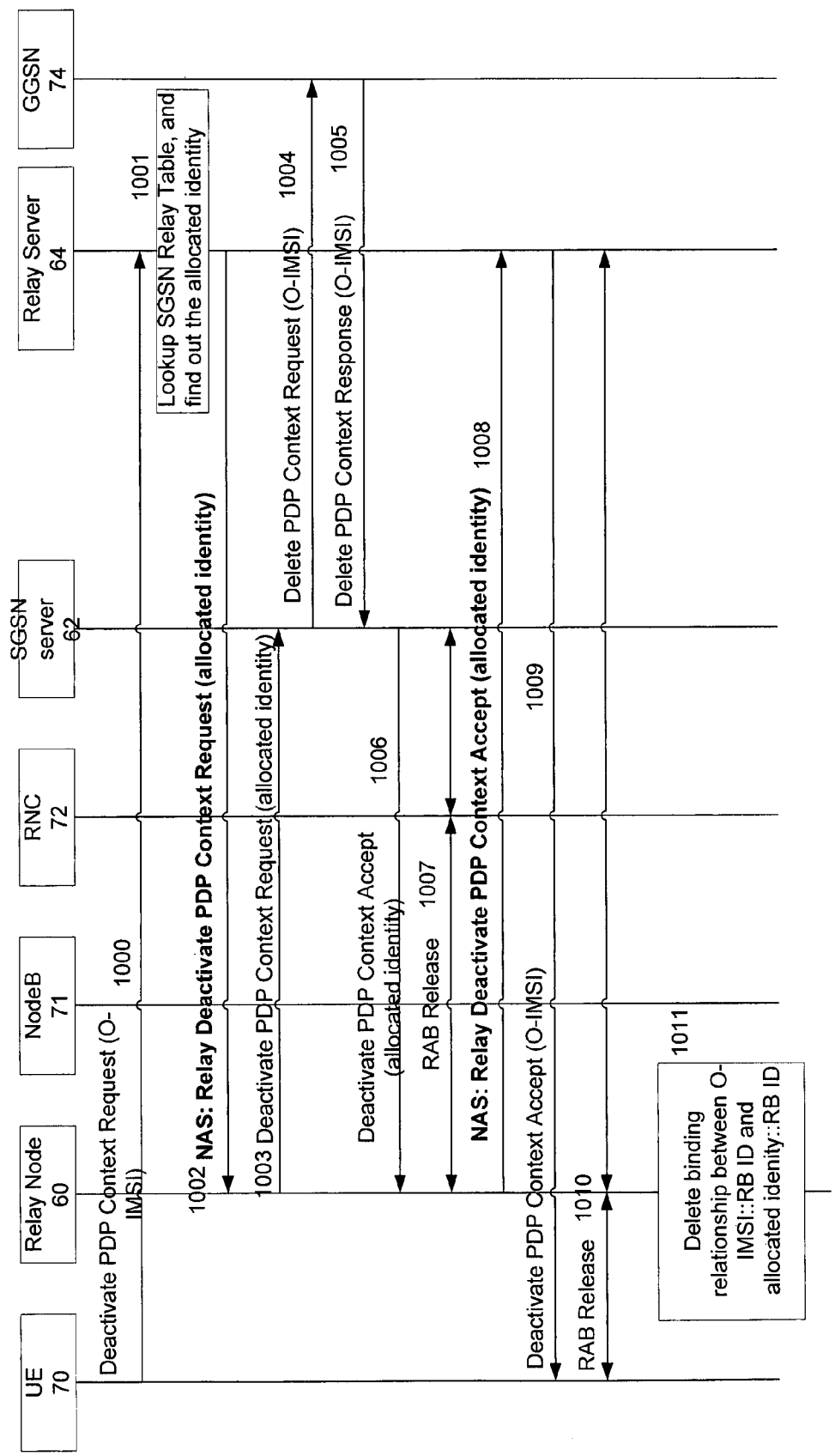

FIG. 11 shows the PDP De-activation procedure. The network elements or nodes involved in this procedure includes RN 60, Node B 71, RNC 72, SGSN server 62, relay server 64, and GGSN server 74. The UE 70 initiates PDP De-activation procedure by sending (step 1000) a Deactivate PDP Context Request message with original IMSI to the relay server 64. On receiving the request, the relay server 64 looks up (step 1001) the server relay table to find out the allocated relay identity. Then the relay server 64 commands the relay UE corresponding to the UE 70 in relay node 60 initiates the Deactivate procedure by sending (step 1002) a NAS relay Deactivate PDP Context Request message with the allocated relay identity. The relay node 60 thus sends (step 1003) the Deactivate PDP Context Request message with the allocated relay identity to the SGSN server 62. The SGSN server 62 looks up the server relay table to find out the original IMSI which corresponds to the received allocated relay identity on receiving the Deactivate PDP Context Request message. After the SGSN server 62 sends (step 1004) the Delete PDP Context Request message with original IMSI to the GGSN server 74 and receives (step 1005) the Delete PDP Context Response message with original IMSI from the GGSN server 74, the SGSN server 62 sends (step 1006) the Deactivate PDP Context Accept message with the relay identity to the relay node 60, in which the relay identity is found by the SGSN server 62 from the server relay table on the basis of the received original IMSI after receiving the Delete PDP Context Response message. Then the signaling connection between the relay UE and the SGSN server 62 and the RRC connection between the relay UE and the RNC 72 are released (step 1007). The relay node 60 then sends (step 1008) a NAS Relay Deactivate PDP Context Accept message with the allocated relay identity to the relay server 64. The relay server 64 finds the original IMSI which corresponds to the received allocated relay identity when receiving the NAS Relay Deactivate PDP Context Accept message. The relay server sends (step 1009) the Deactivate PDP Context Accept message with the found original IMSI as a response to the UE 70. Then the signaling connection between the UE 70 and the relay server 64 can be released (step 1010). Then the relay node deletes (step 1011) mapping relationship between the radio bearer over the Uu interface and the radio bearer over the Un interface.

Figure 12:
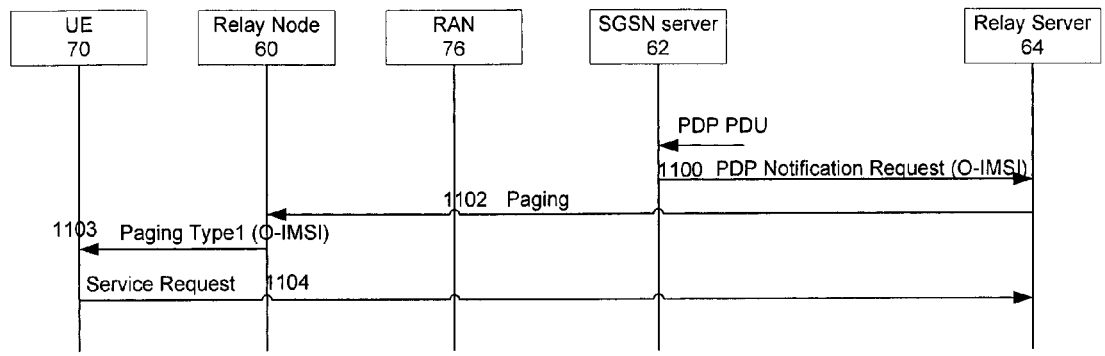
FIG. 7-FIG. 16 show exemplary procedures in the communication network based on the present invention.

FIG. 12 shows the paging procedure. The network elements or nodes involved in this procedure include RN 60, RAN 76, SGSN server 62, and relay server 64. When the UE 70 and relay UE stay in idle state and a PDP PDU with destination to UE arrives at SGSN server 62, SGSN server 62 forwards (step 1100) PDP Notification Request message with original IMSI to relay server 64 to indicate that there is one packet for UE. The relay Server 64 then starts (steps 1102 and 1103) Paging for the UE via Relay Node 60. As response of the paging, the UE 70 starts (step 1104) Service Request procedure to change the UE and the relay UE into the connected state for receiving the packet.

Figure 13:
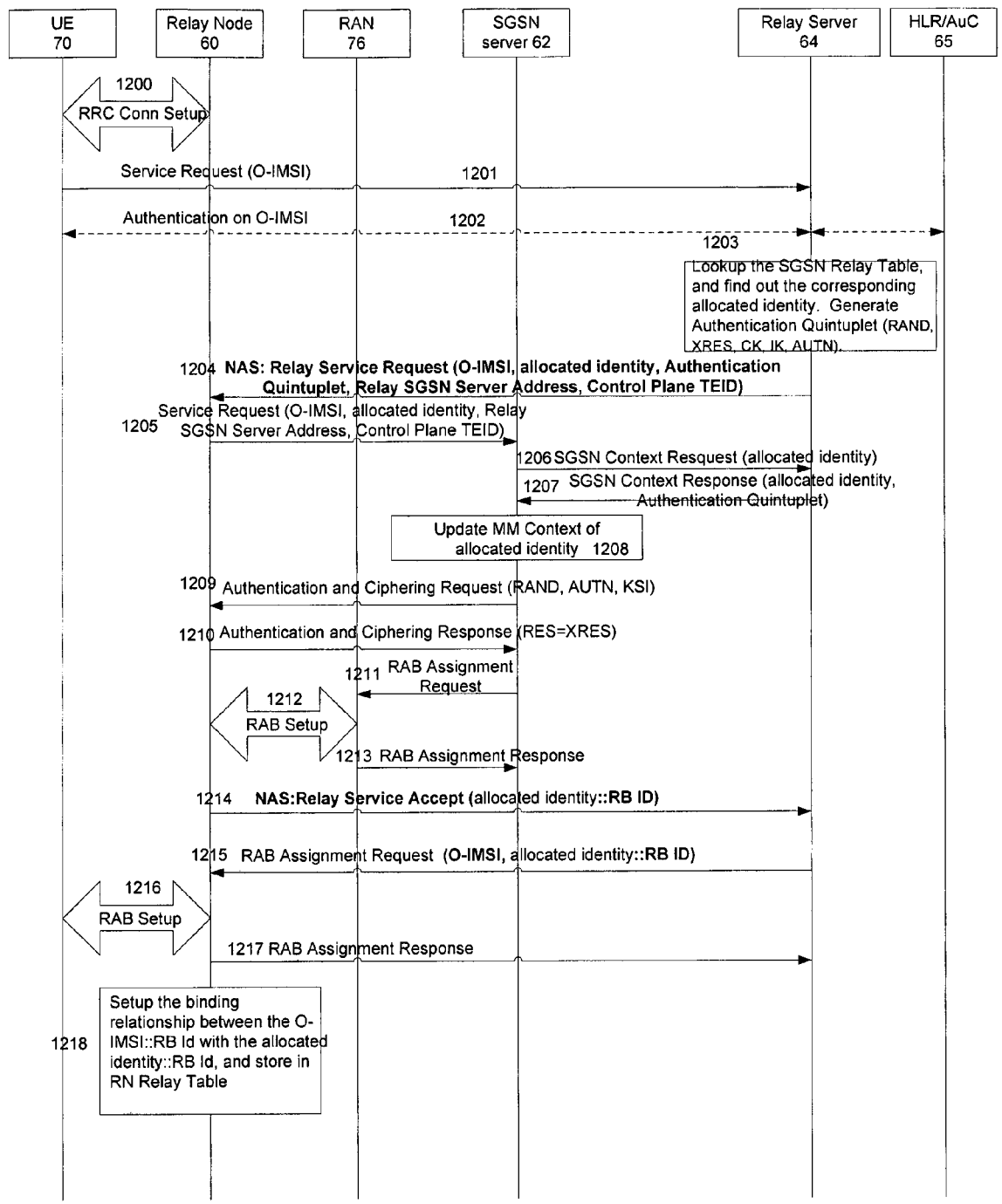

FIG. 13 illustrates the service request procedure. The network elements or nodes involved in this procedure include RN 60, RAN 76, SGSN server 62, relay server 64, and the HLR/AuC 65. Just like the PDP Activation procedure described with reference to FIG. 10, the service request procedure also set up RAB for UE 70 and the relay UE corresponding to the UE 70 separately, and set up the binding relationship between radio bearers over the Uu interface and the Un interface of the relay node 60. However, changing to connected state from idle state need re-authentication between the UE and the Core Network. Thus relay Server 64 allocates new Authentication Quintuplet for relay UE during the service request procedure. The Authentication Quintuplet is sent to the relay UE via a new NAS message Relay Service Request, where the NAS message also contains relay SGSN server Address and control plane TEID. The SGSN server 62 is informed of relay server's address information during service request procedure of the relay UE, so that the UE can obtain Authentication Quintuplet of the relay UE from relay server 64.

After the RRC connection is setup (step 1200) between the UE 70 and the relay node 60, the UE sends (step 1201) a Service Request message with original IMSI to the relay server 64. Then the relay server 64 performs (step 1202) the authentication to the UE 70. After the authentication is passed, the relay server 64 finds the corresponding allocated relay identity by looking up the server relay table, and then the relay server generates the Authentication Quintuplet (RAND, XRES, CK, LK, AUTN), at step 1203. The relay server 64 sends (step 1204) a NAS Relay Service Request message, which contains the original IMSI, the allocated relay identity corresponding to the original IMSI, the Authentication Quintuplet, the relay SGSN Server Address, and Control Plane TEID, to the relay node 60. Then the relay node 60 sends (step 1205) the Service Request message to the SGSN server 62, where the message contains the original IMSI, the allocated relay identity, the relay server address, and the Control Plane TEID. After receiving (step 1206) the SGSN Context Request with the allocated relay identity from the SGSN server 62, the relay server 64 sends (step 1207) the SGSN Context Response message containing the allocated relay identity and the Authentication Quintuplet to the SGSN server 62. Then the SGSN server 62 updates (step 1208) the MM context which is created with the allocated relay identity. After the Authentication and Ciphering Request from the SGSN server 62 to the relay node 60 and the Authentication and Ciphering response from the relay node 60 to the SGSN server 62 (steps 1209 and 1210), the SGSN server 62 sends (step 1211) a RAB Assignment Request message to the RAN 76 to command the relay node 60 to set up the radio bearer over the Un interface of the relay node. Then the RAB is set up (step 1212) between the relay node 60 and the RAN 76. Once the RAB over the Un interface is set up, the relay node 60 sends (step 1213) a RAB Assignment Response message to the SGSN server 62. The relay node 60 sends (step 1214) a NAS Relay Service Accept message containing the information for the radio bearer ID of the set up radio bearer over the Un interface. The relay server 64 then sends (step 1215) a RAB Assignment Request message indicating which radio bearer over the Un interface is mapped to which radio bearer over the Uu interface to the relay node 60. Accordingly, the RAB is set up (step 1216) between the relay node 60 and the UE 70. The relay node 60 sends a RAB Assignment Response message to the relay server 64 (step 1217). And the relay node 60 sets up a mapping relationship between the radio bearer over the Uu interface and that over the Un interface, and the relationship can be saved in the server relay table (step 1218).

Figure 14:
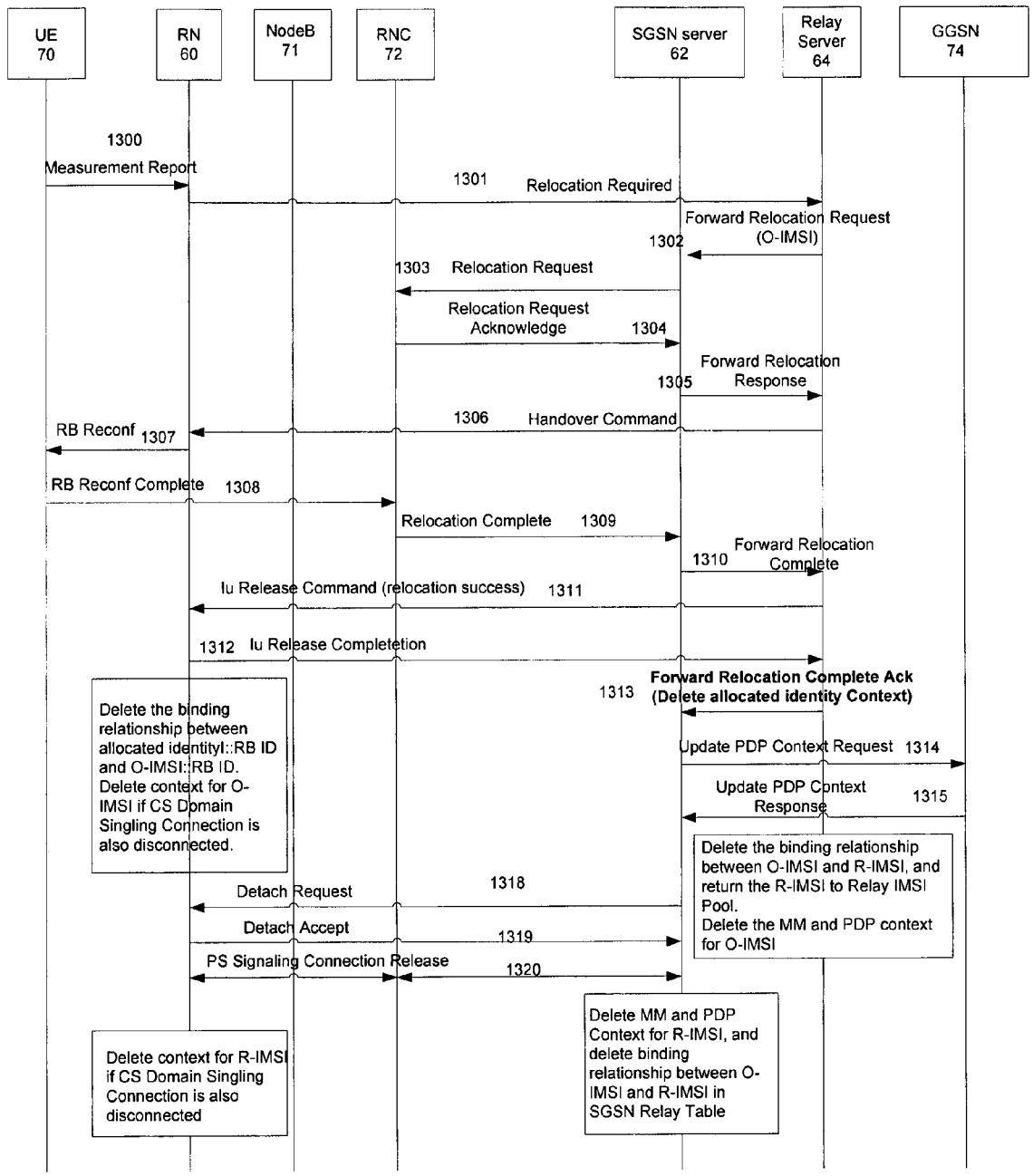

FIG. 14 shows the handover from the relay node to the UTRAN. The network elements or nodes involved in this procedure include RN 60, Node B 71, RNC 72, SGSN server 62, relay server 64, and GGSN server 74. When the relay node 60 receives (step 1300) a Measure Report from UE 70 asking for cell change, a normal handover procedure is performed to relocate the UE 70 from the relay node 60 to UTRAN. The relay node 60 sends (step 1301) a Relocation Required message to the relay server 64, and the relay server 64 sends (step 1302) a Forward Relocation Request with original IMSI to the SGSN server 62. The SGSN server 62 further transmits (step 1303) a Relocation Request to the RNC 72. As a response, the RNC 72 sends (step 1304) a Relocation Request Acknowledge message to the SGSN server 62. The SGSN server 62 then forwards (step 1305) the Forward Relocation Response to the relay server 64. The relay server 64 sends (step 1306) a Handover Command to the relay node 60, commanding the node 60 to initiate the handover. The relay node 60 sends (step 1307) RB reconfiguration message to the UE 70. After completing the reconfiguration, the UE sends (step 1308) a RB Reconfiguration Complete message to the RNC 72. The RNC 72 then note (step 1309) the reconfiguration completing information to the SGSN server 62, and the SGSN server 62 forwards (step 1310) said information to the relay server 64. The relay server 64 then commands (step 1311) the relay node 60 to release the Iu connection by sending a Iu release command. After the Iu release is completed, the relay node 60 sends Iu Release Completion message to the relay server 64 (step 1312). The relay server 64 forwards (step 1313) a Forward Relocation Complete Ack message to the SGSN server 62 to command the SGSN server 62 to delete the context created with the allocated relay identity. The SGSN server 62 requests for (step 1314) updating the PDP context to the GGSN server 74, and the GGSN server 74 sends (step 1315) a response message after receiving the Update PDP Context Request message. The relay server 64 deletes the binding relationship between the original IMSI and the allocated relay identity, and returns said relay identity to the memory storing the plurality of the relay identities. The relay server 64 also deletes the MM and PDP context which is created with the original IMSI for the UE 70. After receiving the Iu Release Completion, the RN 60 deletes the mapping relationship between the radio bearer over the Uu interface and that over the Un interface. It will be noted that in case of CS domain, the signaling connection is also disconnected. The SGSN server 62 sends (step 1318) Detach Request to the relay node 60. After accepting the request, the relay node 60 sends (step 1319) a Detach Accept message to the SGSN server. Then the signaling connection in PS (Packet Switched) domain is released (step 1320). The relay node 60 deletes the context created with the allocated relay identity if the singling connection in CS domain is also disconnected. The SGSN server 62 deletes the MM and PDP context which is created with the allocated relay identity for the relay UE, and deletes the binding relationship between the original IMSI and the allocated relay identity. After the handover complete, the relay server 64 can notify the SGSN Server 62 to detach the relay UE. The relay UE context is then deleted from the relay node 60 and the SGSN server 62. The mapping table in relay node 60 is updated and the server relay tables in the SGSN server 62 and relay server 64, respectively, are also updated after detach.

Figure 15:
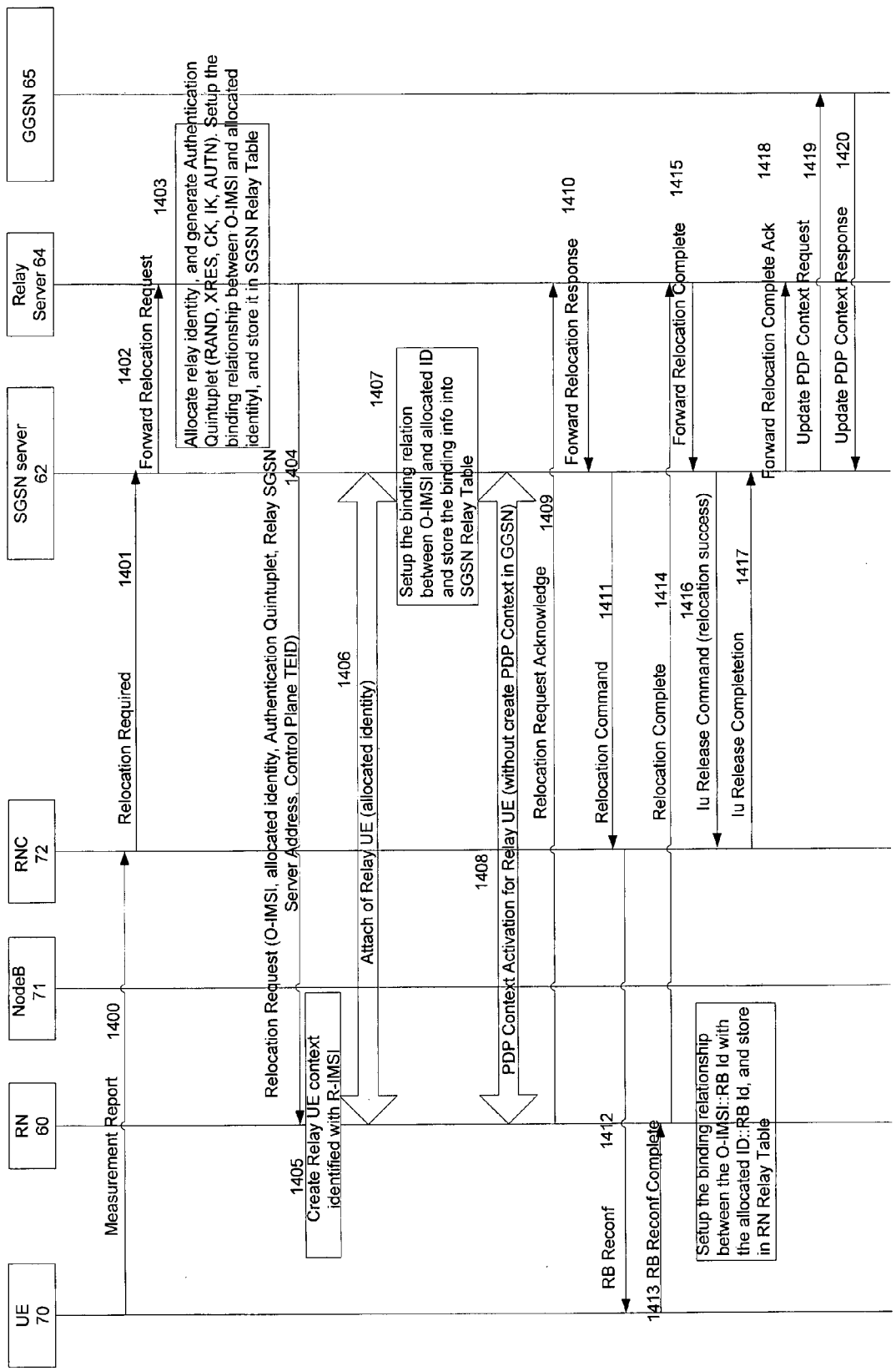

FIG. 15 shows the procedure of handover from UTRAN to RN. The network elements or nodes involved in this procedure include RN 60, Node B 71, RNC 72, SGSN server 62, relay server 64, and GGSN server 74. The RNC 72 sends (step 1401) a Relocation Required message to the SGSN server 62 after receiving (step 1400) the Measure Report from the UE 70. The SGSN server 62 sends (step 1402) a Forward Relocation Request to the relay server 64. At step 1403, the relay server 64 allocates a relay identity to the UE 70 based on the UE's original IMSI, and generates Authentication Quintuplet (RAND, XRES, CK, Ik, AUTN). The relay server 64 also sets up a binding relationship between the original IMSI and the allocated relay identity. It is optionally that the binding relationship is stored in a server relay table. The relay server 64 then sends (step 1404) Relocation Request message including the original IMSI, the allocated relay identity, the Authentication Quintuplet, the relay server address, and the Control Plane TEID to the relay node 60. The relay node 60 creates (step 1405) the relay UE context with the allocated relay identity for the relay UE corresponding to the UE 70. Then, the relay node 60 attaches the relay UE to the SGSN server 62 with the allocated relay identity as shown as step 1406. The SGSN server 62 sets up binding relationship between the original IMSI and the allocated relay identity, at step 1407. It is optionally that the binding relationship is stored in a server relay table. A PDP context activation for relay UE is created (step 1408) between the relay node 60 and the SGSN server 62 without creating PDP context in GGSN server 74. The relay node 60 sends (step 1409) a Relocation Request Acknowledge message to the relay server 64. The relay server 64 forwards (step 1410) the Forward Relocation Response to the SGSN server 62. The SGSN server 62 then sends (step 1411) a Relocation Command to the RNC 72, and the RNC 72 sends (step 1412) a RB Reconfiguration message to the UE 70. After the reconfiguration is completed, the UE sends (step 1413) a RB Reconfiguration Completion message to the relay node 60. The relay node 60 then sends (step 1414) a Relocation Completion message to the relay server 64. The relay server 64 sends (step 1415) a Forward Relocation Completion to the SGSN server 62. The SGSN server 62 sends a Iu Release Command to the RNC 72 (step 1416). After the Iu connection is released, the RNC 72 sends (step 1417) a Iu Release Completion message to the SGSN server 62. The SGSN server 62 then forwards (step 1418) the Forward Relocation Complete Ack message to the relay server 64. The SGSN server 62 requests (step 1419) to the GGSN server 74 for updating the PDP Context. And the GGSN server 74 sends (step 1420) a response to the SGSN server 62 after updating. The relay node 60, after sending Relocation Complete message to the relay server 64, setups the binding relationship between the radio bearer over the Uu interface and that over the Un interface. Optionally, a server mapping table is used to save the mapping relationship.

In general, the relay server 64 can command the relay node 60 to create the relay UE context which is identified with the allocated relay identity, to attach for the relay UE and activate PDP context for the relay UE. After PS RAB is created, the relay node 60 prepares resource at Uu interface to admit the RAB of UE 70. After the UE changes its radio link(s) from UTRAN to RN under the control of radio bearer reconfiguration, the mapping relationship between the radio bearer over the Uu interface for UE and radio bearer over the Un interface for the relay UE set up in relay node 60. The relay server 64 and SGSN Server 62 also set up the binding relationship between original IMSI and the allocated relay identity during the handover.

It is noted that during PDP activation for relay UE, creating the PDP context in GGSN server 74 is not required, as GGSN server 74 is not aware of the existing of relay identity and the relay UE.

Figure 16:
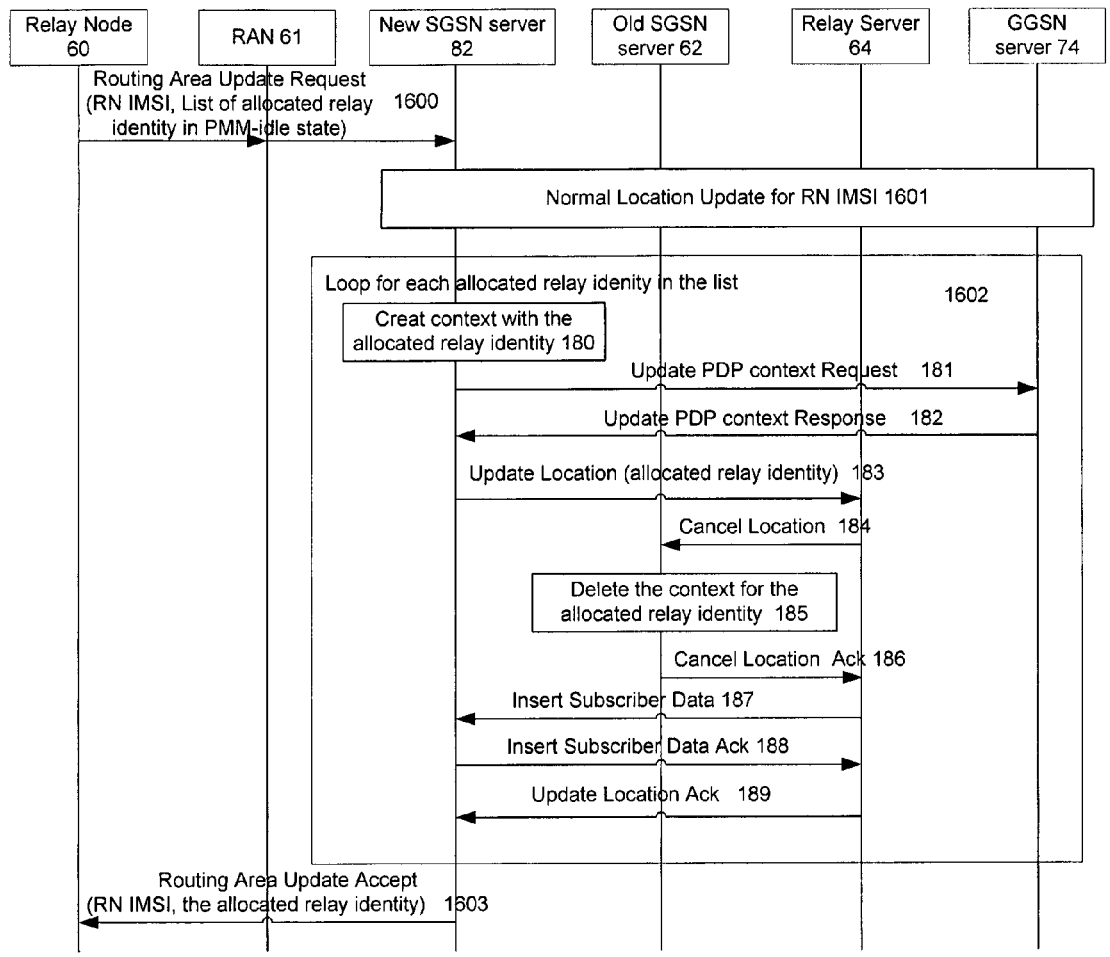

FIG. 16 illustrates the routing area update procedure. Once the relay UE context is created for one UE, the relay UE context is maintained in the relay node until the UE detach from the network or handover from the relay node to UTRAN.

When the relay Node moves from one cell to another cell belonging to different routing area, the procedure of routing area update is triggered, as shown in FIG. 16.

As the UE is under the coverage of the relay node, it can not be aware of moving of the relay node. Therefore the relay node which can be on behalf of each UE and the respective relay UE under its service triggers the routing area update procedure when the relay Node moves from one routing area to another routing area.

As shown, at step 1600, the relay node 60 sends the Routing Area Update Request with the relay node's ID and the list of the allocated relay identity in PMM-idle state to the new SGSN server 82. Therefore a normal location updating for the relay node's ID is performed at step 1601. Then the steps from step 180 to 189 shown in box 1602 are performed with respect to each allocated relay identity of said list. The new SGSN server 82 creates the context for the allocated relay identity (step 180). Then, the new SGSN server 82 sends an Update PDP Context Request message to the GGSN server 74 (step 181). As a response, the GGSN server 74 sends the Update PDP Context Response message to the new SGSN server 82 (step 182). The new SGSN server 82 then sends an Update Location message with the allocated relay identity to the relay server 64 at step 183. The relay server 64 sends Cancel Location to the old SGSN server 62 at step 184. The old SGSN server 62 thus deletes the context created with the allocated relay identity at step 185, and then sends Cancel Location Ack message to the relay server 64 at step 186. The relay server 64 sends the Insert Subscriber Data message to the new SGSN server 82 at step 187. After receiving (step 188) the Insert Subscriber Data Ack message from the new SGSN server 82, the relay server 64 sends (step 189) the Update Location Ack message to the new SGSN server 82. After the series of the steps shown in box 1602 is performed with respect to each allocated relay identity, the new SGSN server 82 sends the Routing Area Update Accept message with the relay node's ID and the list of the allocated relay identity to the relay node 60.

It should be noted that the procedures of RN starting Up, attach, detach, PDP activation, PDP de-activation, paging, service request, handover from the relay node to the UTRAN and from the UTRAN to the relay node which are described hereinabove are described in PS domain. However, it is apparent to those skilled in the art that these procedures can also be used in CS domain with adaptive changes or without any change. Additionally, all procedures above described also can be implemented in other manner according to the present invention, that is to say, it is not necessary for each procedure following the examples as above discussed.

According to embodiments of this invention, the relay technique is introduced to the 3G networks without need to change other nodes or elements in the network except that a little information is introduced to the signaling relating to the SGSN server, because the mapping relationship between the radio bearer over the Uu interface of the relay device and the radio bearer over the Un interface of the relay device is based on the first context and the second context independently of the GTP tunnel or MAC/RLC/PDCP protocols. And therefore the present invention can be used both in CS domain and PS domain.

Although the foregoing invention has been described in some details for purpose of clarity of understanding, it will be apparent that certain changes and modifications may be practiced within the scope of the appended claims. Therefore, the embodiments herein should be taken as illustrative and not restrictive, and the invention should not be limited to the details given herein but should be defined by the appended claims and their full scope of equivalents.

What is claimed:

1. A method for mapping each radio bearer over a Uu interface to a corresponding radio bearer over a Un interface of a relay device in a wireless communication network, including:
   creating a first context for a User Equipment (UE) with an original IMSI (International Mobile Subscriber Identity) of the UE at the Uu interface of the relay device, wherein the first context includes information for the radio bearer over the Uu interface;
   creating a second context for the UE with an allocated relay identity at the Un interface of the relay device, wherein the allocated relay identity has a relationship with the original IMSI, and wherein the second context includes information for the radio bearer over the Un interface;
   forming a relationship between the first context and the second context based on the relationship between the original IMSI and the allocated relay identity; and
   mapping the radio bearer over the Uu interface to the radio bearer over the Un interface based on the relationship between the first context and the second context.

2. The method according to claim 1, further including:
   receiving the allocated relay identity that is selected from a plurality of presetting identities prior to creating the second context for the UE.

3. The method according to claim 1, further including:
   deleting the relationship between the original IMSI and the allocated relay identity upon a detach procedure, a packet data protocol (PDP) de-activation procedure, or a handover from the relay device being performed.

4. The method according to claim 1, wherein the relationship between the allocated relay identity and the original IMSI is a one-to-one relationship.

5. A method for data transmission between a first device and a second device through a relay device in a wireless communication network, including:
   receiving data from the first device via a radio bearer over a Uu interface or a Un interface of the relay device;
   obtaining the radio bearer over the Un interface corresponding to the radio bearer over the Uu interface based on a mapping relationship if the data is received from the Uu interface, or obtaining the radio bearer over the Uu interface corresponding to the radio bearer over the Un interface based on the mapping relationship if the data is received from the Un interface; and transmitting the data to the second device via the obtained radio bearer, wherein said mapping relationship is obtained by:

creating a first context for a User Equipment (UE) with an original IMSI (International Mobile Subscriber Identity) of the UE at the Uu interface of the relay device, wherein the first context includes information for the radio bearer over the Uu interface;

creating a second context for the UE with an allocated relay identity at the Un interface of the relay device, wherein the allocated relay identity has a relationship with the original IMSI, and wherein the second context includes information for the radio bearer over the Un interface;

forming a relationship between the first context and the second context based on the relationship between the original IMSI and the allocated relay identity; and obtaining the mapping relationship based on the relationship between the first context and the second context.

6. The method according to claim 5, wherein the first device is the UE and the second device is Donor Node B, or the first device is Donor Node B and the second device is the UE.

7. The method according to claim 5, further including:

deleting the relationship between the original IMSI and the allocated relay identity upon a detach procedure, a packet data protocol (PDP) de-activation procedure, or a handover from the relay device being performed.

8. The method according to claim 5, wherein the relationship between the allocated relay identity and the original IMSI is a one-to-one relationship.

9. A method for serving a relay device in a wireless communication network, including:

presetting a plurality of relay identities;

allocating a relay identity from the plurality of relay identities to the relay device for a User Equipment (UE) based on original IMSI (International Mobile Subscriber Identity) of the UE; and forming a relationship between the original IMSI and the allocated relay identity.

10. The method according to claim 9, further including:

deleting the relationship between the original IMSI and the allocated relay identity upon a detach procedure, a packet data protocol (PDP) de-activation procedure, or a handover from the relay device being performed.

11. The method according to claim 9, wherein the relationship between the allocated relay identity and the original IMSI is a one-to-one relationship.

12. The method according to claim 9, wherein the wireless communication network is a 3G network.

13. A relay device in a wireless communication network, including:

a receiver arranged to receive data via a radio bearer over a Uu interface of the relay device;

a transmitter arranged to transmit data via a corresponding radio bearer over a Un interface of the relay device, based on a mapping relationship between the radio bearer over the Uu interface and the radio bearer over the Un interface; and a controller arranged to obtain the mapping relationship by:

creating a first context for a User Equipment (UE) with original IMSI (International Mobile Subscriber Identity) of the UE at the Uu interface of the relay device, wherein the first context includes information for the radio bearer over the Uu interface;

creating a second context for the UE with an allocated relay identity at the Un interface of the relay device, wherein the allocated relay identity has a relationship with the original IMSI, and wherein the second context includes information for the radio bearer over the Un interface;

forming a relationship between the first context and the second context based on the relationship between the original IMSI and the allocated relay identity; and obtaining the mapping relationship based on the relationship between the first context and the second context.

14. The relay device according to claim 13, wherein the controller is further arranged to delete the relationship between the original IMSI and the allocated relay identity upon a detach procedure, a packet data protocol (PDP) de-activation procedure, or a handover from the relay device being performed.

15. The relay device according to claim 13, wherein the relationship between the allocated relay identity and the original IMSI is a one-to-one relationship.

16. The relay device according to claim 13, wherein the wireless communication network is a 3G network.

17. A relay server communicating with a relay device in a wireless communication network, including:

a memory arranged to store a plurality of preset relay identities; and a controller arranged to allocate a relay identity from the plurality of preset relay identities for a User Equipment (UE) based on original IMSI (International Mobile Subscriber Identity) of the UE, and forming a relationship between the original IMSI and the allocated relay identity, wherein the allocated relay identity is used by the relay device for creating a relay UE context including information for radio bearers over the Un interface.

18. The relay server according to claim 17, wherein the original IMSI is used by the relay device for creating a first context including information for radio bearers over the Uu interface.

19. The relay server device according to claim 17, wherein the memory is further used for storing Mobility Management (MM) context for the UE.

20. The relay server according to claim 17, wherein the relationship between the allocated relay identity and the original IMSI is a one-to-one relationship.

* * * * *